(12) United States Patent
Tabirian et al.

(10) Patent No.: US 11,982,906 B1
(45) Date of Patent: May 14, 2024

(54) POLARIZATION-INDEPENDENT DIFFRACTIVE OPTICAL STRUCTURES

(71) Applicant: Beam Engineering for Advanced Measurements Co., Orlando, FL (US)

(72) Inventors: Nelson V. Tabirian, Winter Park, FL (US); David E. Roberts, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 291 days.

(21) Appl. No.: 17/458,761

(22) Filed: Aug. 27, 2021

Related U.S. Application Data

(63) Continuation-in-part of application No. 16/293,122, filed on Mar. 5, 2019, now Pat. No. 11,175,441.
(Continued)

(51) Int. Cl.
*G02F 1/13363* (2006.01)
*G02F 1/1335* (2006.01)

(52) U.S. Cl.
CPC .. *G02F 1/133638* (2021.01); *G02F 1/133526* (2013.01); *G02F 2201/305* (2013.01); *G02F 2203/22* (2013.01)

(58) Field of Classification Search
CPC ......... G02F 1/133528; G02F 1/133531; G02F 1/133538; G02F 1/133541; G02B 5/1833; G02B 5/1866; G02B 5/3025; G02B 5/3083; G02B 27/4205; G02B 1/08; G02B 5/18; G02B 2005/1804; G02B 5/18147; G02B 5/1828; G02B 5/1871; G02B 5/30; G02B 5/3016; G02B 5/32; G02B 26/08; G02B 26/0808; G02B 27/106; G02B 27/1086; G02B 27/28; G02B 27/283; G02B 27/286; G02B 27/42; G02B 27/4272
USPC ..... 359/486.01, 573, 558, 566, 569, 483.01, 359/485.05, 187.03, 489.01, 489.06, 359/489.07, 489.08, 489.09, 489.15,
(Continued)

(56) References Cited

U.S. PATENT DOCUMENTS

| | | |
|---|---|---|
| 1,970,734 A | 8/1934 | Buffelen |
| 2,088,456 A | 7/1937 | Wood |

(Continued)

FOREIGN PATENT DOCUMENTS

| | | |
|---|---|---|
| EP | 1970734 | 9/2008 |
| EP | 2088456 | 12/2009 |

(Continued)

OTHER PUBLICATIONS

Li, J., et al., "Refractive Indices of Liquid Crystals for Display Applications", IEEE/OSA Journal of Display Technology, Sep. 2005, 51-61, vol. 1, No. 1, 11 Pages.
(Continued)

*Primary Examiner* — Arnel C Lavarias
(74) *Attorney, Agent, or Firm* — Brian S. Steinberger; Hilary F. Steinberger; Law Offices of Brian S. Steinberger, P.A.

(57) ABSTRACT

Diffractive optical structures, lenses, waveplates, devices, systems, and methods, which have the same effect on light regardless of the polarization state of the light, utilizing systems of polarization discriminator diffractive waveplate optics and differential polarization converters with special arrangements that do not require introducing spatial separation between the layers.

13 Claims, 14 Drawing Sheets

Related U.S. Application Data

(60) Provisional application No. 62/638,651, filed on Mar. 5, 2018.

(58) Field of Classification Search
USPC ......... 359/489.16; 349/1, 18, 193, 194, 201, 349/202; 362/19; 353/20
See application file for complete search history.

(56) References Cited

U.S. PATENT DOCUMENTS

| | | |
|---|---|---|
| 2,209,751 A | 7/1940 | Wulff |
| 2,435,616 A | 2/1948 | Vittum |
| 3,721,486 A | 3/1973 | Bramley |
| 3,897,136 A | 7/1975 | Bryngdahl |
| 4,160,598 A | 7/1979 | Firester et al. |
| 4,301,023 A | 11/1981 | Schuberth |
| 4,698,816 A | 10/1987 | Chun |
| 4,956,141 A | 9/1990 | Allen |
| 4,983,332 A | 1/1991 | Hahn et al. |
| 5,032,009 A | 7/1991 | Gibbons et al. |
| 5,042,950 A | 8/1991 | Salmon, Jr. |
| 5,047,847 A | 9/1991 | Toda et al. |
| 5,100,231 A | 3/1992 | Sasnett et al. |
| 5,142,411 A | 8/1992 | Fiala |
| 5,150,234 A | 9/1992 | Takahashi et al. |
| 5,218,610 A | 6/1993 | Dixon |
| 5,321,539 A | 6/1994 | Hirabayashi et al. |
| 5,325,218 A | 6/1994 | Willett et al. |
| 5,446,596 A | 8/1995 | Mostrorocco |
| 5,619,325 A | 4/1997 | Yoshida |
| 5,621,525 A | 4/1997 | Vogeler et al. |
| 5,712,721 A | 1/1998 | Large |
| 5,895,422 A | 4/1999 | Hauber |
| 5,903,330 A | 5/1999 | Funfschilling et al. |
| 5,907,435 A | 5/1999 | Ang |
| 5,989,758 A | 11/1999 | Komatsu et al. |
| 6,091,471 A | 7/2000 | Kim et al. |
| 6,107,617 A | 8/2000 | Love et al. |
| 6,139,147 A | 10/2000 | Zhang |
| 6,170,952 B1 | 1/2001 | La Haye et al. |
| 6,191,880 B1 | 2/2001 | Schuster |
| 6,219,185 B1 | 4/2001 | Hyde |
| 6,320,663 B1 | 11/2001 | Ershov |
| 6,373,549 B1 | 4/2002 | Tombling et al. |
| 6,452,145 B1 | 9/2002 | Graves et al. |
| 6,551,531 B1 | 4/2003 | Ford et al. |
| 6,678,042 B2 | 1/2004 | Tabirian et al. |
| 6,728,049 B1 | 4/2004 | Tabirian et al. |
| 6,792,028 B2 | 9/2004 | Cook et al. |
| 6,810,169 B2 | 10/2004 | Bouevitch |
| 6,911,637 B1 | 6/2005 | Vorontsov et al. |
| 7,048,619 B2 | 5/2006 | Park et al. |
| 7,094,304 B2 | 8/2006 | Nystrom et al. |
| 7,095,772 B1 | 8/2006 | Delfyett et al. |
| 7,196,758 B2 | 3/2007 | Crawford et al. |
| 7,319,566 B2 | 1/2008 | Prince et al. |
| 7,324,286 B1 | 1/2008 | Glebov et al. |
| 7,450,213 B2 | 11/2008 | Kim et al. |
| 7,482,188 B2 | 1/2009 | Moon et al. |
| 7,764,426 B2 | 7/2010 | Lipson et al. |
| 8,045,130 B2 | 10/2011 | Son |
| 8,077,388 B2 | 12/2011 | Gerton et al. |
| 8,264,623 B2 | 9/2012 | Marrucci |
| 8,339,566 B2 | 12/2012 | Escuti |
| 8,520,170 B2 | 8/2013 | Escuti et al. |
| 8,537,310 B2 * | 9/2013 | Escuti .................. G02F 1/1393 349/98 |
| 8,582,094 B1 | 11/2013 | Shortt et al. |
| 8,643,822 B2 | 2/2014 | Tan et al. |
| 8,937,701 B2 | 1/2015 | Rossini |
| 8,982,313 B2 | 3/2015 | Escuti et al. |
| 9,535,258 B1 | 1/2017 | Whiteaker |
| 9,541,772 B2 | 1/2017 | De Sio et al. |
| 9,557,456 B2 | 1/2017 | Tabirian et al. |
| 9,592,116 B2 | 3/2017 | De Sio et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,753,193 B2 | 9/2017 | Tabirian et al. |
| 9,976,911 B1 | 5/2018 | Tabirian et al. |
| 9,983,479 B2 | 5/2018 | Tabirian et al. |
| 10,031,424 B2 | 7/2018 | Tabirian et al. |
| 10,036,886 B2 | 7/2018 | Tabirian et al. |
| 10,075,625 B2 | 9/2018 | Tabirian et al. |
| 10,107,945 B2 | 10/2018 | Tabirian et al. |
| 10,114,239 B2 | 10/2018 | Tabirian et al. |
| 10,120,112 B2 | 11/2018 | Tabirian et al. |
| 10,185,182 B2 | 1/2019 | Tabirian |
| 10,191,191 B2 | 1/2019 | Tabirian et al. |
| 10,191,296 B1 | 1/2019 | Tabirian et al. |
| 10,197,715 B1 | 2/2019 | Tabirian et al. |
| 10,274,650 B2 | 4/2019 | Tabirian et al. |
| 10,274,805 B2 | 4/2019 | Tabirian et al. |
| 10,330,947 B2 | 6/2019 | Tabirian et al. |
| 10,423,045 B2 | 9/2019 | Tabirian et al. |
| 10,436,957 B2 | 10/2019 | Tabirian |
| 10,557,977 B1 | 2/2020 | Tabirian et al. |
| 10,948,801 B1 * | 3/2021 | Lu .......................... G02C 7/083 |
| 2001/0002895 A1 | 6/2001 | Kawano et al. |
| 2001/0018612 A1 | 8/2001 | Carson et al. |
| 2001/0030720 A1 | 10/2001 | Ichihashi |
| 2002/0027624 A1 | 3/2002 | Seiberle |
| 2002/0097361 A1 | 3/2002 | Ham |
| 2002/0167639 A1 | 11/2002 | Coates et al. |
| 2003/0021526 A1 | 1/2003 | Bouevitch |
| 2003/0072896 A1 | 4/2003 | Kwok et al. |
| 2003/0086156 A1 | 5/2003 | McGuire |
| 2003/0137620 A1 | 7/2003 | Wang et al. |
| 2003/0152712 A1 | 8/2003 | Motomura et al. |
| 2003/0206288 A1 | 11/2003 | Tabirian et al. |
| 2003/0214700 A1 | 11/2003 | Sidorin et al. |
| 2003/0218801 A1 | 11/2003 | Korniski et al. |
| 2004/0051846 A1 | 3/2004 | Blum et al. |
| 2004/0081392 A1 | 4/2004 | Li et al. |
| 2004/0105059 A1 | 6/2004 | Ohyama et al. |
| 2004/0165126 A1 | 8/2004 | Ooi et al. |
| 2004/0226752 A1 | 11/2004 | Keskiniva et al. |
| 2005/0030457 A1 | 2/2005 | Kuan et al. |
| 2005/0110942 A1 | 5/2005 | Ide |
| 2005/0219696 A1 | 10/2005 | Albert et al. |
| 2005/0271325 A1 | 12/2005 | Anderson et al. |
| 2005/0276537 A1 | 12/2005 | Frisken |
| 2005/0280717 A1 | 12/2005 | Sugimoto |
| 2006/0008649 A1 | 1/2006 | Shinichiro |
| 2006/0055883 A1 | 3/2006 | Morris et al. |
| 2006/0109532 A1 | 5/2006 | Savas et al. |
| 2006/0221449 A1 | 10/2006 | Glebov et al. |
| 2006/0222783 A1 | 10/2006 | Hayashi et al. |
| 2007/0019179 A1 | 1/2007 | Fiolka et al. |
| 2007/0032866 A1 | 2/2007 | Portney |
| 2007/0040469 A1 | 2/2007 | Yacoubian |
| 2007/0115551 A1 | 5/2007 | Spilman et al. |
| 2007/0122573 A1 | 5/2007 | Yasuike et al. |
| 2007/0132930 A1 | 6/2007 | Ryu et al. |
| 2007/0247586 A1 | 10/2007 | Tabirian et al. |
| 2007/0256677 A1 | 11/2007 | Yim et al. |
| 2008/0024705 A1 | 1/2008 | Hasegawa et al. |
| 2008/0130555 A1 | 6/2008 | Kalhan |
| 2008/0130559 A1 | 6/2008 | Pi |
| 2008/0226844 A1 | 9/2008 | Shemo et al. |
| 2008/0278675 A1 | 11/2008 | Escuti et al. |
| 2009/0002588 A1 | 1/2009 | Lee et al. |
| 2009/0052838 A1 | 2/2009 | McDowall et al. |
| 2009/0073331 A1 | 3/2009 | Shi et al. |
| 2009/0122402 A1 | 5/2009 | Shemo et al. |
| 2009/0135462 A1 | 5/2009 | Kumar et al. |
| 2009/0141216 A1 | 6/2009 | Marrucci |
| 2009/0201572 A1 | 8/2009 | Yonak |
| 2009/0256977 A1 | 10/2009 | Haddock et al. |
| 2009/0257106 A1 | 10/2009 | Tan et al. |
| 2009/0264707 A1 | 10/2009 | Hendriks et al. |
| 2010/0003605 A1 | 1/2010 | Gil et al. |
| 2010/0066929 A1 | 3/2010 | Shemo et al. |

(56) References Cited

U.S. PATENT DOCUMENTS

| | | |
|---|---|---|
| 2010/0245954 A1 | 9/2010 | Ahling |
| 2011/0069377 A1 | 3/2011 | Wu et al. |
| 2011/0075073 A1 | 3/2011 | Oiwa et al. |
| 2011/0085117 A1 | 4/2011 | Moon et al. |
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers et al. |
| 2011/0262844 A1 | 10/2011 | Tabirian et al. |
| 2012/0075168 A1 | 3/2012 | Osterhout et al. |
| 2012/0092735 A1* | 4/2012 | Futterer ............... G02B 27/126 359/11 |
| 2012/0140167 A1 | 6/2012 | Blum |
| 2012/0162433 A1 | 6/2012 | Fuentes Gonzalez |
| 2012/0188467 A1 | 7/2012 | Escuti et al. |
| 2013/0057814 A1 | 3/2013 | Prushinskiy et al. |
| 2013/0202246 A1 | 8/2013 | Meade et al. |
| 2014/0055740 A1 | 2/2014 | Spaulding et al. |
| 2014/0211145 A1 | 7/2014 | Tabirian et al. |
| 2014/0252666 A1 | 9/2014 | Tabirian et al. |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0011564 A1 | 1/2016 | Tanabe et al. |
| 2016/0023993 A1 | 1/2016 | Tabirian et al. |
| 2016/0047955 A1 | 2/2016 | Tabirian et al. |
| 2016/0047956 A1 | 2/2016 | Tabirian et al. |
| 2016/0209560 A1 | 7/2016 | Tabirian et al. |
| 2016/0231592 A9 | 8/2016 | Beaton et al. |
| 2016/0270656 A1 | 9/2016 | Samec et al. |
| 2016/0282639 A1 | 9/2016 | von und zu Liechtenstein |
| 2016/0363484 A1 | 12/2016 | Barak et al. |
| 2016/0363738 A1 | 12/2016 | Ito |
| 2017/0010397 A1 | 1/2017 | Tabirian et al. |
| 2017/0307892 A1 | 10/2017 | Freeman et al. |
| 2017/0373459 A1 | 12/2017 | Weng |
| 2019/0113377 A1 | 4/2019 | Johnston et al. |
| 2020/0089078 A1* | 3/2020 | Serati ...................... G02F 1/292 |
| 2023/0204964 A1* | 6/2023 | Jamali .................... G02B 13/14 345/8 |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Tabiryan, et al., The Promise of Diffractive Waveplates, OPN Optics and Photonics News, Mar. 2010, 6 pages.
Tabiryan, et al., Fabricating Vector Vortex Waveplates for Coronagraphy; Aerospace Conference, 2012, EEE; publicly available Apr. 19, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Nersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt , et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water-soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, reflective liquid crystal phase grating, Applied Physics Letter 71, Oct. 20, 1997, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.

(56) References Cited

OTHER PUBLICATIONS

Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
Mceldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent Polarization Gratings in Photosensitive Langmuir-Blodgett Films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamate-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, vol. 42, 2003, 3 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements, Optical Society of America, vol. 35, No. 9, May 2010, 3 pages.
Serak, S., et al., High-efficiency 1.5 mm Thick Optical Axis Grating and its Use for Laser Beam Combining, Optical Society of America, vol. 32, No. Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.
Oise, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.
Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering For Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microrubbing, Japanese Journal of Applied Physics, vol. 44, No. 1A, 2005, 4 pages.
Tabirian, N., et al., U.S. Appl. No. 61/757,259, filed Jan. 28, 2013, 29 pages.
Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Vernon, J., et al., Recording Polarization Gratings with a Standing Spiral Wave, Applied Physics Letters, Oct. 2013, vol. 103, 4 pages.
Gerchberg, et al., practical algorithm for the determination of the phase from image and diffraction plane pictures, 1972, Optik, vol. 35, Issue 2, pp. 237-246, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers, Jan. 2012, 150-186, vol. 4, 38 pgs.
Pepper, M. et al., Nonlinear Optical Phase Conjugation, IEEE, Sep. 1991, pp. 21-34, 14 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Roberts, D. et al., "Polarization-Independent Diffractive Waveplate Optics," Mar. 2018, IEEE Aerospace Conference, 11 pages.

(56) References Cited

OTHER PUBLICATIONS

Weng, Y., et al., "Polarization Volume Grating With High Efficiency and Large Diffraction Angle", Optics Express, Aug. 8, 2016, 17746-17759, vol. 24, No. 16, 14 Pages.
Tabiryan, Nelson V., et al., Transparent thin film polarizing and optical control systems, AIP Advances 1, 022153 (1-11), 2011, 11 pages.
Serak, S. V., et al., High-contrast, low-voltage variable reflector for unpolarized light, Molecular Crystals and Liquid Crystals, vol. 657 (1), 156-166, 2017, 12 pages.

\* cited by examiner

POLARIZATION-INDEPENDENT DIFFRACTIVE OPTICAL STRUCTURES

CROSS REFERENCE TO RELATED APPLICATIONS

This application is a Continuation-In-Part of U.S. patent application Ser. No. 16/293,122 filed Mar. 5, 2019, now U.S. Pat. No. 11,175,441, which claims the benefit of priority to U.S. Provisional Application Ser. No. 62/638,651 filed Mar. 5, 2018. The entire disclosure of the applications listed in this paragraph is incorporated herein by specific reference thereto.

GOVERNMENT LICENSE RIGHTS

This invention was made with government support under Contract No. FA8650-16-C-5411 awarded by the U.S. Air Force Research Laboratory. The government has certain rights in this invention.

FIELD OF THE INVENTION

This invention relates generally to the field of optics, and in particular to diffractive optical structures, lenses, waveplates, devices, systems, methods, and processes which have the same effect on light regardless of the polarization state of the light.

BACKGROUND OF THE INVENTION

Diffractive optical structures are used in many ways in optics. Common uses are as dispersive elements in spectrometers and in lens systems. In this context, an optical structure that is "dispersive" is one for which the effect on light reflecting from, or transmitting through, the optical structure is highly dependent on wavelength. For example, over a wide range of conditions, the angle through which light is diffracted by the simplest diffractive optical structures is approximately proportional to the wavelength. This is in contrast with the angle through which light is refracted by common optical refractive materials such as glass or transparent plastic. For such refractive materials, the angle through which light is refracted is nearly independent of the wavelength.

Methods have recently been developed for fabrication of a type of transmissive diffractive structure variously described in the literature by the terms diffractive waveplate, polarization grating, Pancharatnam phase device, Pancharatnam-Berry optical element, or geometric phase grating. Diffractive optical structures described by these terms have the property that diffraction of light results from the spatial modulation of the optical anisotropy axis (director) in an anisotropic dielectric material. For our purposes, we will refer to such diffractive optical structures as diffractive waveplates.

An exceptional feature of diffractive waveplates, compared with other types of diffractive structures, is that the diffraction efficiency can be very high over a range of wavelengths, and essentially all of the light incident on the diffractive waveplate over a range of wavelengths is diffracted.

Another exceptional feature of diffractive waveplates, compared with many other types of diffractive structures, is that optical properties of some diffractive waveplates can be electrically switched. This ability to switch the optical properties of some diffractive waveplates is due to the fact that the optically-active part of some diffractive waveplates is a liquid crystal layer, and the physical configuration of liquid crystals can be readily manipulated by application of an electric field.

One of the properties of the most well-known types of transmissive diffractive waveplate is that their effect on the light that is transmitted through them depends strongly on the circular polarization handedness of the incident light. If the diffractive waveplate has spatial properties such that it acts as a lens, then its focal length will be positive for one circular polarization, and negative for the opposite handedness of circular polarization. If the diffractive waveplate has the property that an incident plane wave results in an output plane wave propagating in a different direction from the incident beam, then an incident plane wave of one circular polarization will be deflected in one direction, and an incident plane wave of the other circular polarization will be deflected in the opposite direction. For example, if an incident plane wave of one circular polarization is deflected up, then an incident plane wave of the other circular polarization will be deflected down. If an incident plane wave of one circular polarization is deflected to the right, then an incident plane wave of the other circular polarization will be deflected to the left.

In some applications, this differential action by diffractive waveplates on the propagation of light is beneficial. However, in other applications, it would be desirable for the diffractive waveplate to have the same effect on light of any polarization. Many applications for diffractive waveplates would become possible if systems employing diffractive waveplates could be devised such that these systems have the same effect on light of either circular polarization.

Thus, there is a need for types of diffractive waveplates and arrangements of diffractive waveplates that have the same effect on light regardless of the polarization of the light.

SUMMARY OF THE INVENTION

The primary objective of the present invention is to provide diffractive optical structures, lenses, waveplates, devices, systems, and methods which have the same effect on propagation of light regardless of the polarization state of the light.

The second objective of the present invention is to provide specific types of diffractive waveplates that have the same effect on incident light regardless of the polarization of the light. These specific types of diffractive waveplates include, for example, lenses, beam steering systems and components, and axicons.

Many of the exemplary applications have been described herein with terms such as "light" being used to describe electromagnetic radiation that is acted upon by the disclosed diffractive waveplate structures. The term "light" in this context should not be taken to restrict the scope of the disclosed embodiments to only those in which the electromagnetic radiation acted upon or manipulated by the diffractive waveplate structures is in the visible region of the spectrum. As will be evident to those skilled in the art, the exemplary embodiments disclosed here, in addition to being applicable in the visible region of the spectrum, are equally applicable to the microwave, infrared, ultraviolet, and X-ray regions of the spectrum.

Further objects and advantages of this invention will be apparent from the following detailed description of the presently preferred embodiments which are illustrated schematically in the accompanying drawings.

DETAILED DESCRIPTION OF THE INVENTION

Figure 1:
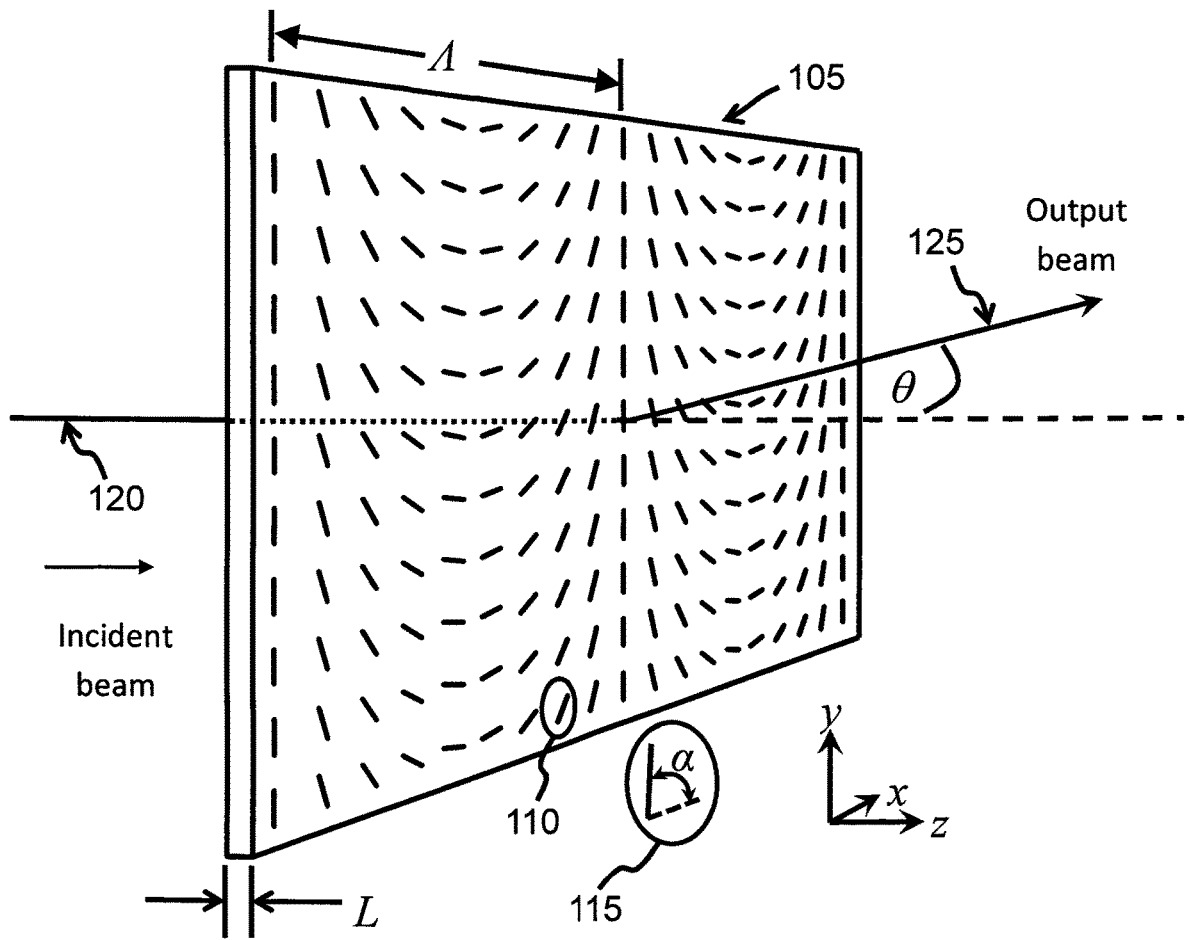
FIG. 1 shows the variation of the anisotropy axis orientation with position for a cycloidal diffractive waveplate, using the prior art.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary of the Invention above and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

A listing of components will now be described:
105 cycloidal diffractive waveplate (CDW)
110 orientation of the anisotropy axis at a point on a CDW plane
115 illustration of the angle α between the anisotropy axis and a Cartesian coordinate in a plane parallel to the surface of a CDW
120 plane wave of light incident on a CDW
125 plane wave of light diffracted by a CDW
205 continuous lines that are tangent to the local anisotropy axis orientation in a diffractive waveplate lens
210 photograph of a diffractive waveplate lens between crossed linear polarizers
215 schematic representation of the orientation of the molecules of a liquid crystal or liquid crystal polymer at several transverse locations on a diffractive waveplate lens
305 continuous lines that are tangent to the local anisotropy axis orientation in a diffractive waveplate lens
310 dependence on transverse position, i.e. position in a plane parallel to the surface of the lens, of the orientation of the anisotropy axis of the material constituting a diffractive waveplate lens
405 plane wave of light containing both a RHCP component and a LHCP component, incident on a diffractive waveplate lens
410 point in space at which both RHCP and LHCP components of a plane wave are brought to a focus by an assembly of three diffractive waveplate lenses
415 first diffractive waveplate lens encountered by a beam of light traversing an assembly of three diffractive waveplate lenses
420 second diffractive waveplate lens encountered by a beam of light traversing an assembly of three diffractive waveplate lenses
425 third diffractive waveplate lens encountered by a beam of light traversing an assembly of three diffractive waveplate lenses
430 LHCP component of a plane wave of light incident on a diffractive waveplate lens
435 RHCP component of a plane wave of light incident on a diffractive waveplate lens
505 LHCP component of a plane wave of light incident on a CDW
510 RHCP component of a plane wave of light incident on a CDW
515 cycloidal diffractive waveplate
520 plane wave of light that was RHCP at input to CDW 515, converted to LHCP and diffracted in the +x direction by CDW 515
525 plane wave of light that was LHCP at input to CDW 515, converted to RHCP and diffracted in the −x direction by CDW 515
530 phase retarder with anisotropy axis oriented at an angle such that the plane wave represented by 520 has its circular polarization converted from LHCP to RHCP by the phase retarder, and the plane wave represented by 525 passes through the phase retarder with no change in circular polarization, which remains RHCP
535 plane wave at the output from the phase retarder 530, propagating in the same direction as the plane wave 520, but with circular polarization opposite to that of plane wave 520
540 plane wave at the output from the phase retarder 530, propagating in the same direction as the input plane wave 525, with the same circular polarization as that of plane wave 525
545 anisotropy axis of the phase retarder 530
600 polarization-independent diffractive waveplate system
605 LHCP component of a plane wave of light beam incident on CDW 615
610 RHCP component of a plane wave of light beam incident on CDW 615
615 CDW with a period $\Lambda_1$ of approximately 5 μm, designed to diffract LHCP radiation at a wavelength of approximately 633 nm in one direction and RHCP radiation at this same wavelength in another direction
620 LHCP input plane wave component 605, after having been diffracted in the upward direction and converted to RHCP by CDW 615
625 RHCP input plane wave component 610, after having been diffracted in the downward direction and converted to LHCP by CDW 615
630 phase retarder with the property that upon transmission through the retarder, the circular polarization of beam 620 is unaffected, resulting in beam 635, whereas the circular polarization of beam 625 is changed, resulting in beam 640
635 plane wave 620 after passage through phase retarder 630, without change in circular polarization
640 plane wave 625 after passage through phase retarder 630, with circular polarization changed from LHCP to RHCP
645 CDW with a period $\Lambda_2$ of approximately 2.61 μm, designed to diffract radiation with a wavelength of approximately 633 nm
650 plane wave 635 after it has been diffracted, and having its polarization changed, by CDW 645
655 plane wave 640 after it has been diffracted, and having its polarization changed, by CDW 645
660 phase retarder with the property that upon transmission through the retarder, the circular polarization of beam 650 is unaffected, resulting in beam 670, whereas the circular polarization of beam 655 is changed, resulting in beam 675
665 CDW with a period $\Lambda_3$ of approximately 5 μm, designed to diffract LHCP radiation at a wavelength of approximately 633 nm in one direction and RHCP radiation at this same wavelength in another direction
670 plane wave 650 after passage through phase retarder 660, without change in circular polarization
675 plane wave 655 after passage through phase retarder 660, with circular polarization changed from LHCP to RHCP
680 RHCP plane wave beam, having been diffracted by the polarization-independent diffractive waveplate system 600 through an angle of approximately 14°
685 LHCP plane wave beam, having been diffracted by the polarization-independent diffractive waveplate system 600 through an angle of approximately 14°
705 laser with a plane wave output beam
710 screen onto which the radiation from laser 705 impinges
715 LHCP component of the linearly-polarized output beam from laser 705
720 RHCP component of the linearly-polarized output beam from laser 705

Figure 8:
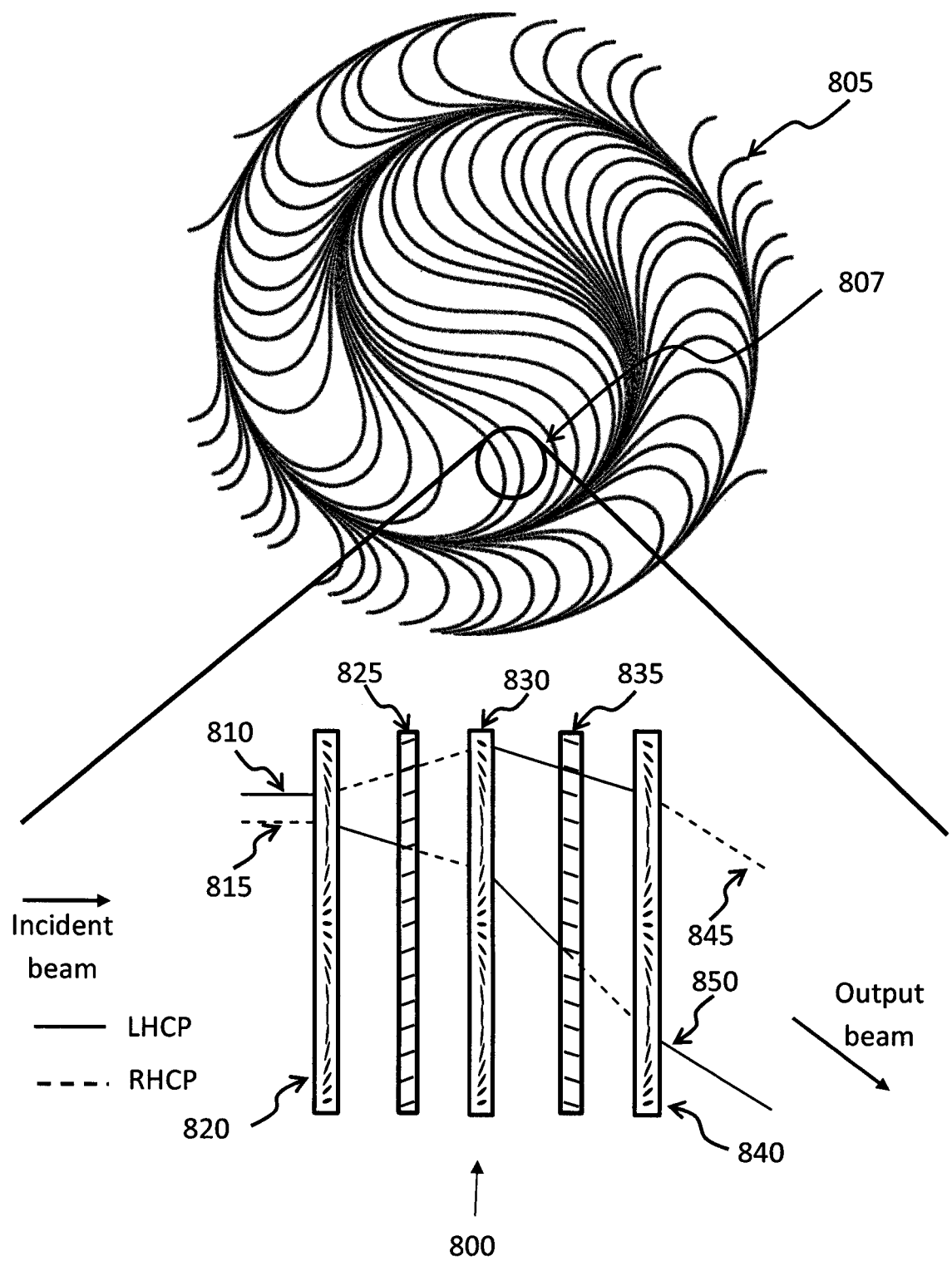
FIG. 8 shows a graphical illustration of a polarization-independent diffractive waveplate system, a composite diffractive focusing system consisting of two diffractive waveplate axicons, a diffractive waveplate lens, and two O-plates. The composite diffractive focusing system has the same focal length independent of the polarization of light. The top part of the figure shows the spatial variation of the orientation of the anisotropy axis of the diffractive waveplate lens. The bottom part of the figure shows the five layers of the composite diffractive focusing system.

725 location on the screen 710 at which the beam from laser 705 impinges
730 first CDW which diffracts the LHCP component of the output from laser 705 in the upward direction in the figure, and converts this radiation to RHCP, while diffracting the RHCP component of the output from laser 705 in the downward direction in the figure, and converts this radiation to LHCP
735 position on the screen 710 at which the RHCP radiation emanating from CDW 730 impinges
740 position on the screen 710 at which the LHCP radiation emanating from CDW 730 impinges
745 second CDW which diffracts the two beams emanating form CDW 730 in opposite directions
750 position on screen 710 at which the RHCP beam emanating form CDW 745 impinges
755 position on screen 710 at which the LHCP beam emanating form CDW 745 impinges
760 first phase retarder, which changes the circular polarization of one of the circularly-polarized beams emanating from CDW 730 to the opposite handedness and passes the other circularly-polarized beam emanating from CDW 730 without affecting its polarization
765 second phase retarder, which changes the circular polarization of one of the circularly-polarized beams emanating from CDW 745 to the opposite handedness and passes the other circularly-polarized beam emanating from CDW 745 without affecting its polarization
770 third CDW which diffracts the LHCP component of radiation emanating from CDW 765 in the downward direction in the figure, and converts this radiation to RHCP beam 775, while diffracting the RHCP component of of radiation emanating from CDW 765 in the upward direction in the figure, and converts this radiation to LHCP beam 780
775 RHCP beam obtained by diffraction by CDW 770 of the LHCP component of radiation emanating from phase retarder 765
780 LHCP beam obtained by diffraction by CDW 770 of the RHCP component of radiation emanating from phase retarder 765
785 location at which both the RHCP and LHCP beams emanating from CDW 770 impinge on screen 710
800 polarization-independent diffractive waveplate system acting as a lens
805 continuous lines tangent at each point to the local direction of the anisotropy axis of the diffractive waveplate lens 830, a component of the polarization-independent diffractive waveplate system 800
807 small section of the diffractive waveplate lens 830, one of the components of the polarization-independent diffractive waveplate system 800, all five components of which are shown in the lower portion of FIG. 8
810 LHCP component of a plane wave of light incident on polarization-independent diffractive waveplate system 800
815 RHCP component of a plane wave of light incident on polarization-independent diffractive waveplate system 800
820 first diffractive waveplate axicon, which diffracts all light impinging on it through the same angle towards the axis of the polarization-independent diffractive waveplate system 800 for one circular polarization, and through the same angle but away from the axis for the other circular polarization
825 first phase retarder, which converts the circular polarization of one of the beams transmitted, and leaves the polarization of the other beam unchanged
830 diffractive waveplate lens
835 second phase retarder, which converts the circular polarization of one of the beams transmitted, and leaves the polarization of the other beam unchanged
840 second diffractive waveplate axicon
845 RHCP component of the output beam from the polarization-independent diffractive waveplate system 800
850 LHCP component of the output beam from the polarization-independent diffractive waveplate system 800
1000 stack of four polarization volume gratings (PVGs)
1005 LHCP component of the plane wave beam incident on the stack 1000 of four PVGs
1010 RHCP component of the plane wave beam incident on the stack 1000 of four PVGs
1012 plane of equal orientation of the anisotropy axis of PVG 1025
1013 direction of propagation of the LHCP component 1005 of the incident beam, after diffraction and conversion to RHCP by PVG 1025
1015 LHCP component of the plane wave beam emanating from the stack of four PVGs
1020 RHCP component of the plane wave beam emanating from the stack of four PVGs
1025 first PVG encountered by the incident beam
1030 second PVG encountered by the incident beam
1035 third PVG encountered by the incident beam
1040 fourth PVG encountered by the incident beam
1100 stack of four polarization volume gratings (PVGs) comprising a polarization-independent high-efficiency diffractive waveplate system
1105 LHCP component of the plane wave beam incident on the stack of four PVGs
1110 RHCP component of the plane wave beam incident on the stack of four PVGs
1112 plane of equal orientation of the anisotropy axis of PVG 1125
1113 direction of propagation of the LHCP component 1005 of the incident beam, after diffraction and conversion to RHCP by PVG 1125
1115 LHCP component of the plane wave beam emanating from the stack of four PVGs
1120 RHCP component of the plane wave beam emanating from the stack of four PVGs
1125 first PVG encountered by the incident beam
1130 second PVG encountered by the incident beam
1135 third PVG encountered by the incident beam
1140 fourth PVG encountered by the incident beam
1500 switchable diffractive waveplate system
1510 switchable diffractive waveplate
1520 substrates
1530 transparent conductive electrodes and alignment layers
1535 liquid crystal
1540 electrical conductors connecting electronic controller to transparent conductive electrodes
1550 electronic controller
1580 incident optical beam
1585 undeflected transmitted optical beam
1590 diffracted transmitted optical beam Diffractive waveplates of various types are known and have found many uses in optical systems. Diffractive waveplates are shown and described in U.S. Pat. No. 10,423,045 to Roberts et al., which is assigned to the same assignee as the subject patent application, and which is incorporated by reference in its entirety.

Switchable diffractive waveplate lenses are shown and described in U.S. Pat. Nos. 10,274,650, 10,120,112, 10,191,191, 10,557,977, and 10,114,239 to Tabirian et al., which are all assigned to the same assignee as the subject patent application, and which are all incorporated by reference in their entirety.

Methods of fabrication of diffractive waveplate lenses and mirrors are described in U.S. Pat. No. 10,197,715 to Tabirian et al., which is assigned to the same assignee as the subject patent application, and which is incorporated by reference in its entirety.

Switchable cycloidal diffractive waveplates are shown and described in U.S. Pat. No. 9,658,512 to Tabirian et al., which is assigned to the same assignee as the subject patent application, which is also incorporated by reference in its entirety.

Polarization-independent switchable lens systems are shown and described in U.S. Pat. No. 10,274,805 to Tabirian et al., which is assigned to the same assignee as the subject patent application, which is also incorporated by reference in its entirety.

The simplest type of diffractive waveplate, called a cycloidal diffractive waveplate (CDW), is illustrated in FIG. 1 from the prior art. The CDW 105 consists of a layer of birefringent material of thickness L, comprising a birefringent material with birefringence Δn. The birefringence is defined as $\Delta n = n_e - n_o$, where $n_e$ is the extraordinary index of refraction and $n_o$ is the ordinary index of refraction of the birefringent material. For such a CDW designed to operate at or near a wavelength λ, the thickness is adjusted such that $L\Delta n = \lambda/2$. When this expression is met, it is said that the thickness of the CDW meets the half-wave phase retardation condition at wavelength λ. For wavelengths in the visible spectral band, and with typical liquid crystal and liquid crystal polymer materials, Δn is typically of the order of 0.15, so the thickness of the CDW is of the order of 2 μm, and can therefore be deposited as a film on any transparent substrate. For our purposes here, it will be assumed that the anisotropy axis 110 is in the plane of the CDW film, which will be assumed here to be the x-y plane, as shown in FIG. 1. For a CDW, the orientation of the anisotropy axis varies along only one of the Cartesian coordinates in a plane parallel to the surface of the CDW. This coordinate was chosen for FIG. 1 to be the x coordinate. The angle α that the anisotropy axis makes with the x axis, shown at 115, is a function of the x-coordinate, $\alpha = \pi x/\Lambda$, where Λ is the period of the CDW. For such a CDW, for period Λ large compared to the wavelength λ, normally incident plane-wave light, that is, light incident along the z axis as shown at 120 in FIG. 1, is diffracted with nearly 100% efficiency through an angle $\theta = \sin^{-1}(\lambda/\Lambda)$ into an output beam 125.

Figure 2:
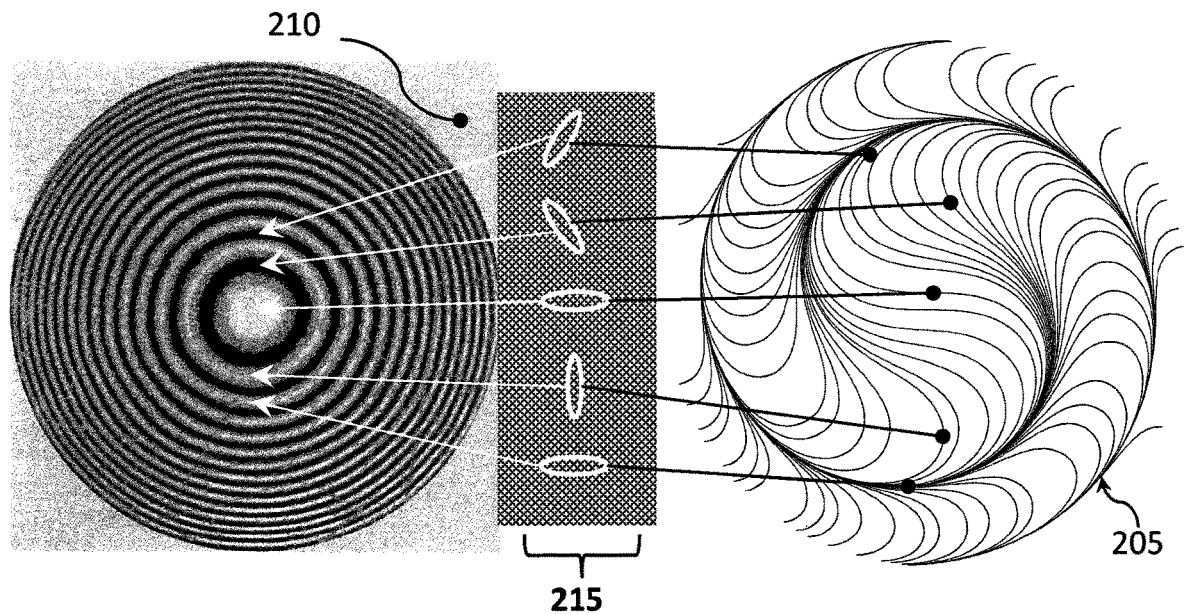
FIG. 2 shows a photograph of a diffractive waveplate lens between crossed linear polarizers, and an illustration of the spatial variation of the anisotropy axis orientation in a diffractive waveplate lens, using the prior art.
Figure 3:
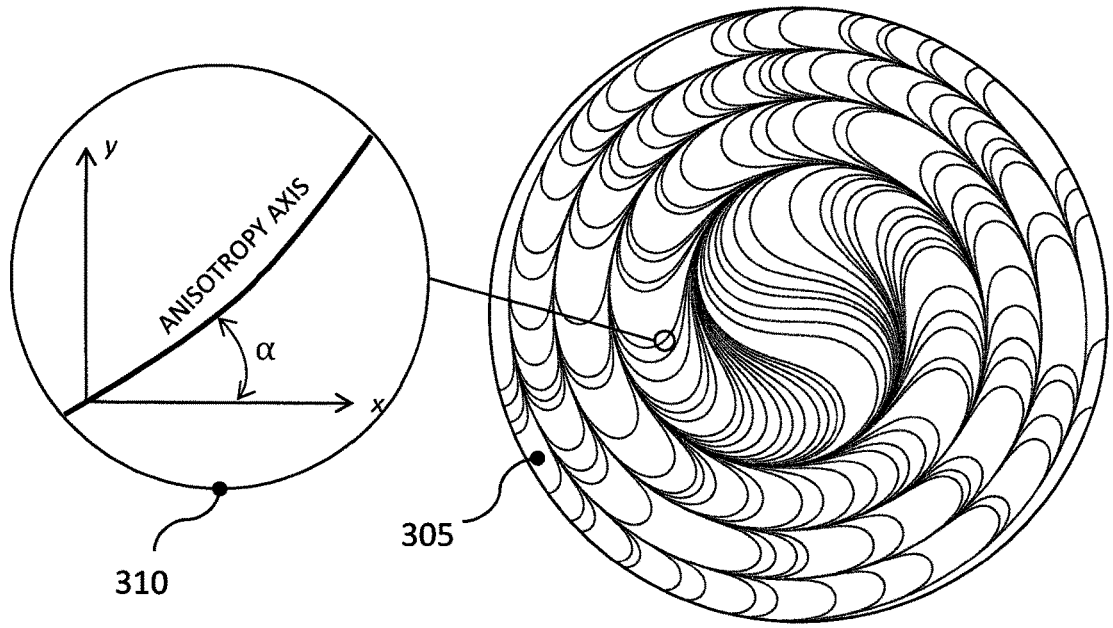
FIG. 3 shows the notation used to describe the spatial variation of the anisotropy axis orientation in a diffractive waveplate lens, using the prior art.

The CDW has the same effect on a monochromatic plane wave of light as a refractive prism: it turns the beam through an angle. Refractive material such as glass can be used to make lenses, which have the effect of focusing a plane wave. Similarly, as disclosed in previously cited U.S. Patents, changing the pattern of the anisotropy axis in a thin layer of birefringent material results in a diffractive waveplate lens, as illustrated in FIG. 2 from the prior art. A specific pattern of anisotropy axis orientation, as described in the cited U.S. Pat. Nos. 10,274,650, 10,120,112, 10,191,191, 10,557,977, and 10,114,239 to Tabirian et al. and illustrated in FIG. 2 at 205, results in a diffractive waveplate lens, which focuses a plane wave. On the left side of FIG. 2 at 210 is a photograph of a diffractive waveplate lens between crossed linear polarizers. This photograph enables visualization of the spatial dependence of the orientation of molecules 215 of the birefringent material comprising the diffractive waveplate lens. The spatial variation of the anisotropy axis orientation in a diffractive waveplate lens is further illustrated in FIG. 3 from the prior art. The spatial dependence of the anisotropy axis orientation angle in a diffractive waveplate lens is further illustrated at 305, and the angle α that the anisotropy axis makes with one of the axes parallel to the surface of the birefringence film comprising the diffractive waveplate lens is shown at 310. The continuous lines at 205 in FIG. 2 and at 305 in FIG. 3 are tangent to the local direction of the anisotropy axis in the diffractive waveplate lenses shown in these figures.

Figure 4:
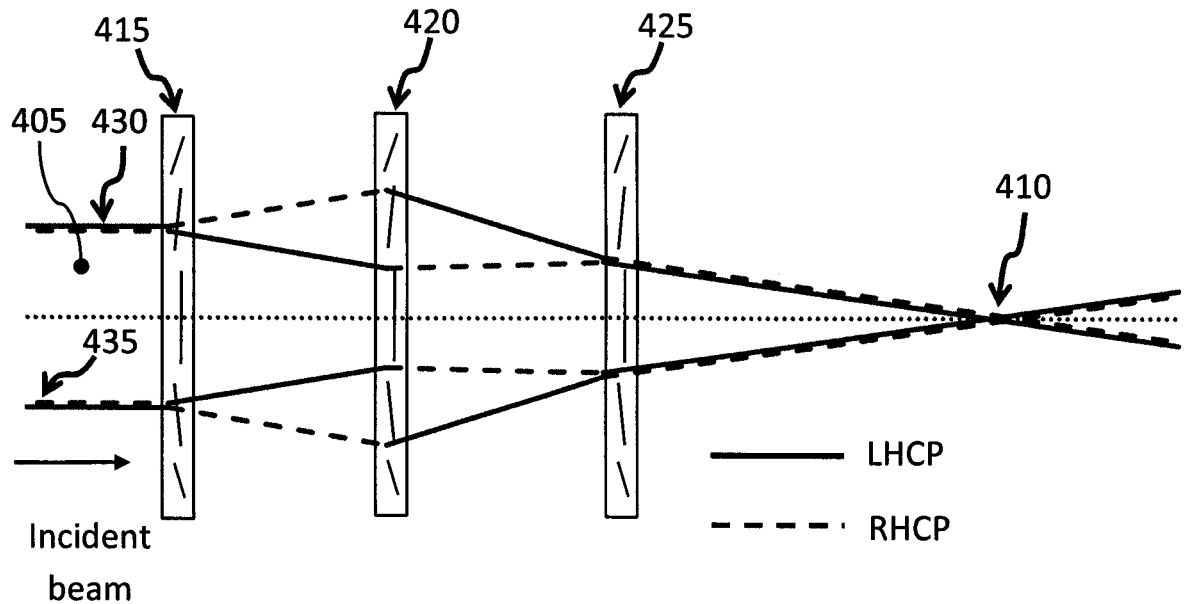
FIG. 4 shows an arrangement of three diffractive waveplate lenses, the arrangement resulting in focusing of light of any polarization to the same focal point, using the prior art.

The CDW of FIG. 1 from the prior art and the diffractive waveplate lens of FIG. 2 from the prior art have the property that the effect of these elements on light depends on the polarization of the light. If the CDW of FIG. 1 diffracts an LHCP input plane wave in one direction, the same CDW will diffract an RHCP input plane wave in the opposite direction. If the focal length of the diffractive waveplate lens of FIG. 2 has a focal length of f for LHCP light, then it will have a focal length of −f for RHCP light. While in some applications, this differential effect is either desirable or at least not detrimental, in other applications it is desirable that the effect of the diffractive waveplate device be the same for any polarization of light. In some cases, such as in the configuration of FIG. 4 from the prior art, it is possible to create a combination of diffractive waveplate lenses that focus a plane wave 405 of arbitrary polarization to the same point 410, using a combination of three diffractive waveplate lenses 415, 420, and 425. For the arrangement shown in FIG. 4, both the LHCP component 430 of the input beam and the RHCP component 435 of the input beam are brought to the same focal point 410. The main disadvantages of this approach are that it requires three components instead of one, and that the components must be spaced apart in a particular way, as disclosed in U.S. Pat. No. 10,191,191 to Tabirian et al. In FIG. 4, the changes in circular polarization of the LHCP and RHCP components upon passage through each successive diffractive waveplate lens are denoted by changes in the lines representing these two components between solid and dashed.

One way to cause a single CDW to deflect both the LHCP and RHCP components of a plane wave in the same direction, or to cause a single diffractive waveplate lens to focus both the LHCP and RHCP components of a plane wave to the same point, is to convert one of the circular polarization components into the other, such that all of the input beam has the same circular polarization. There are prior art methods of converting one circular polarization component of an input optical plane wave into the other circular polarization, such that all of the input light has the same circular polarization. One such prior art method is described in the published article by N. Tabiryan et al., "Transparent thin film polarizing and optical control systems," in Nelson V. Tabiryan, Sarik R. Nersisyan, Timothy J. White, Timothy J. Bunning, Diane M. Steeves, and Brian R. Kimball, Transparent thin film polarizing and optical control systems, AIP ADVANCES 1, 022153 (1-11), 2011.

Figure 5:
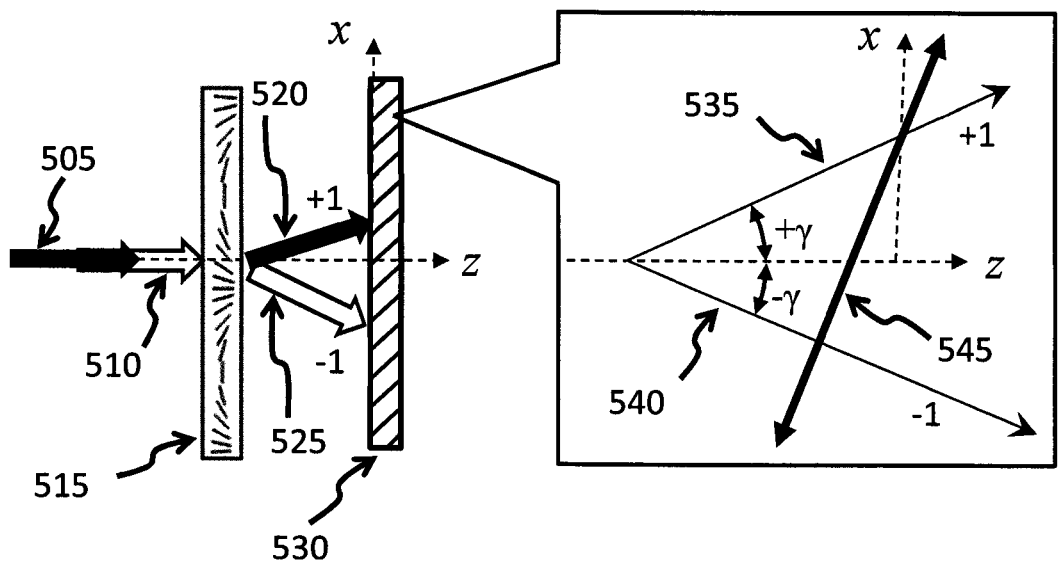
FIG. 5 shows the conversion of a plane wave containing light of both circular polarizations to two plane waves with different propagation directions, but the same circular polarization, using the prior art.

The prior art method described in this publication is illustrated in FIG. 5. In FIG. solid arrows indicate the direction of propagation of LHCP light, and outlines of arrows represent the direction of propagation of RHCP light. FIG. 5 shows an input plane wave with both an LHCP component 505 and an RHCP component 510. The CDW 515 converts the RHCP component of the input beam into LHCP, and diffracts this beam through an angle +γ in the +x direction, the +1 order of diffraction, as indicated at 520. The CDW 515 converts the LHCP component of the input beam into RHCP, and diffracts this beam through an angle −γ in the −x direction, the −1 order of diffraction, as indicated at 525. Because the direction of propagation of the LHCP light 520 emanating from the CDW 515 is different from the direction of propagation of the RHCP light 525 emanating from this CDW, the effects on the polarization of these two plane waves of transmission through the phase retarder 530 are different. As described in the referenced publication, due to the spatial arrangement of the anisotropy axis 545 of the phase retarder 530, the circular polarization of both of the components 535 and 540 at the output from the phase retarder are the same. Therefore, if a diffractive waveplate element such as a CDW or a diffractive waveplate lens is placed after the phase retarder 530, it will have the same effect on both of these components of the optical beam.

As shown in FIG. 5, although the two components of the light field at the output of the phase retarder have the same circular polarization, they are propagating in different directions. Therefore, if an additional CDW is placed in the beam path after the phase retarder 530, that is, at a z-axis location larger than the z-axis location of the phase retarder 530, each of the two components of the beam incident on the additional CDW would be diffracted by the same angle, so there would still be two plane waves at the output of the additional CDW. This is in contrast to the desired situation, in which if all of the radiation of either polarization that was incident on the CDW 515 is propagating in the same direction.

The CDW 515 in FIG. 5 will be referred to as a polarization discriminator diffractive waveplate optic since it can be used for the purpose of separating the components 505 and 510 of the input beam into two beams propagating in different directions. The phase retarder 530 in FIG. 5 will be referred to as a differential polarization converter because it can be used for the purpose of converting the polarization of one of the beams that is incident on it, but not the other.

Figure 6:
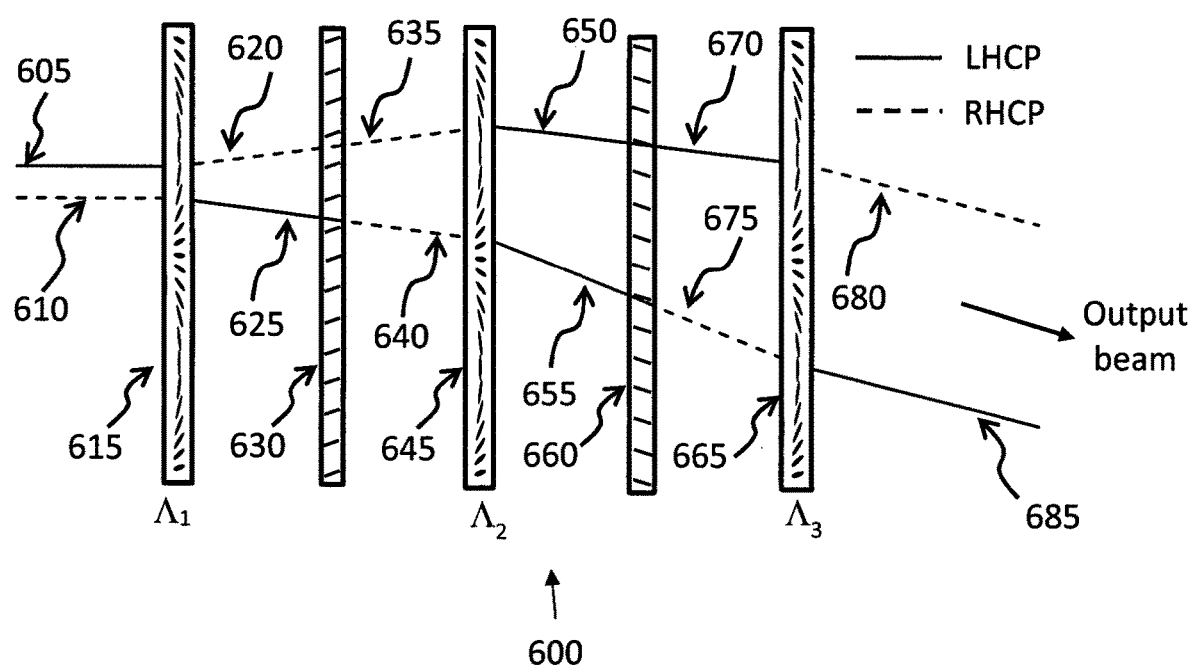
FIG. 6 shows a polarization-independent diffractive waveplate system, in which light of any polarization is deflected through the same angle.
Figure 7A:
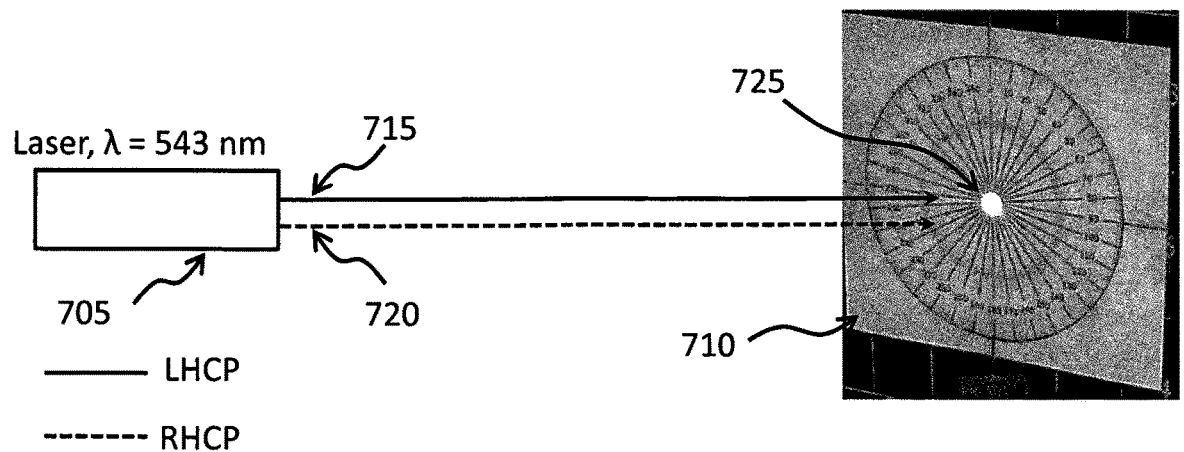
FIG. 7A shows propagation of a laser beam to a screen, prior to the insertion of any diffractive element into the path between the laser and the screen. The laser beam impinges on the center of the screen. A photograph of the screen with the laser beam is shown on the right side of the figure.
Figure 7B:
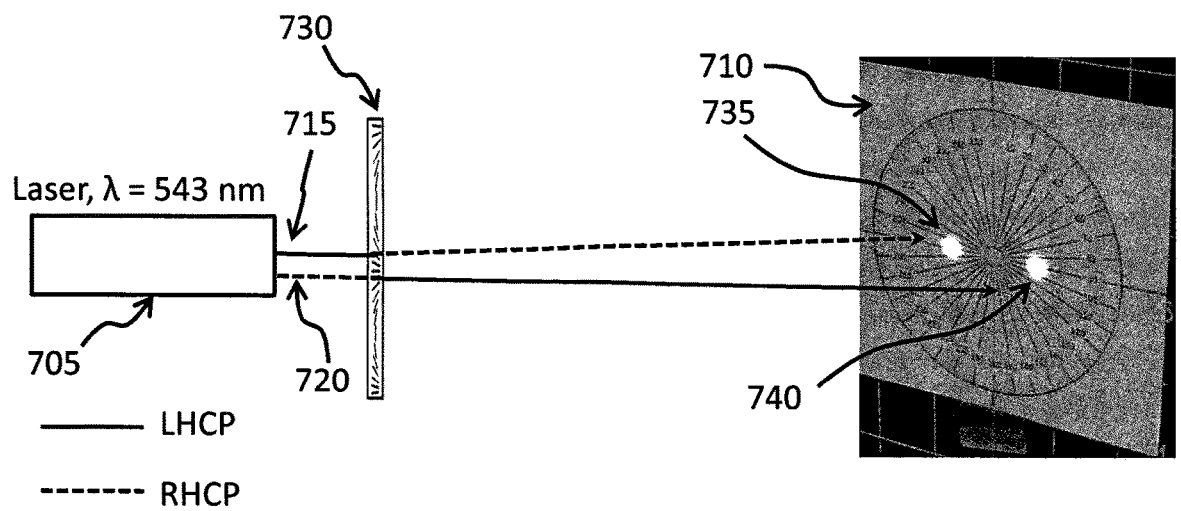
FIG. 7B shows deflection of a laser beam by a cycloidal diffractive waveplate (CDW) before the laser beam impinges on a screen. One circular polarization component of the linearly-polarized laser beam is diffracted in one direction, and the other circular polarization component is diffracted in the opposite direction. A photograph of the screen shows the two locations where the two circular polarizations of light impinge.
Figure 7C:
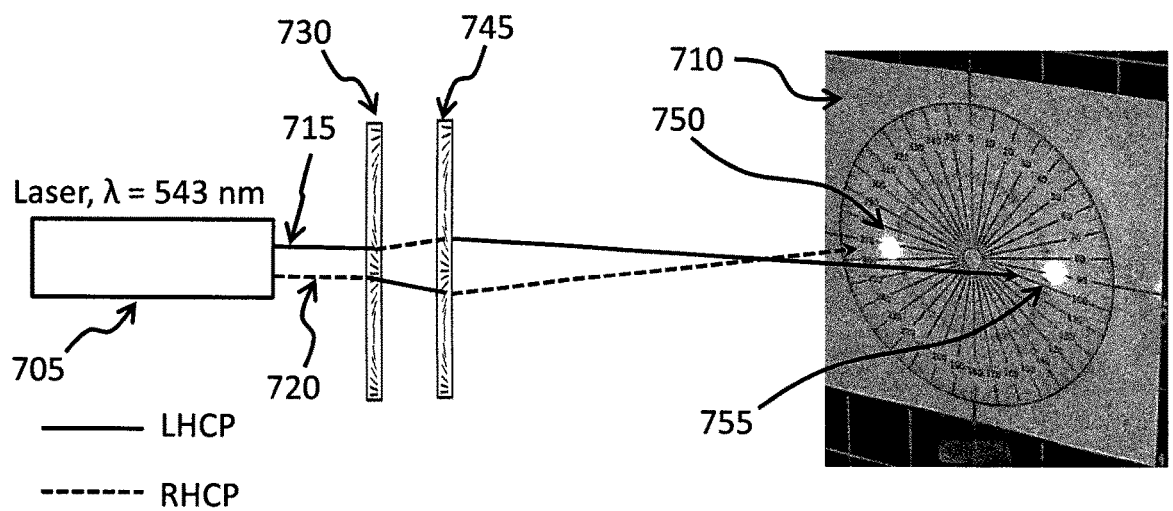
FIG. 7C shows deflection of a laser beam by two CDWs with different periods, before the laser beam impinges on a screen. One circular polarization component of the linearly-polarized laser beam is diffracted in one direction, and the other circular polarization component is diffracted in the opposite direction. A photograph of the screen shows the two locations where the two circular polarizations of light impinge.
Figure 7D:
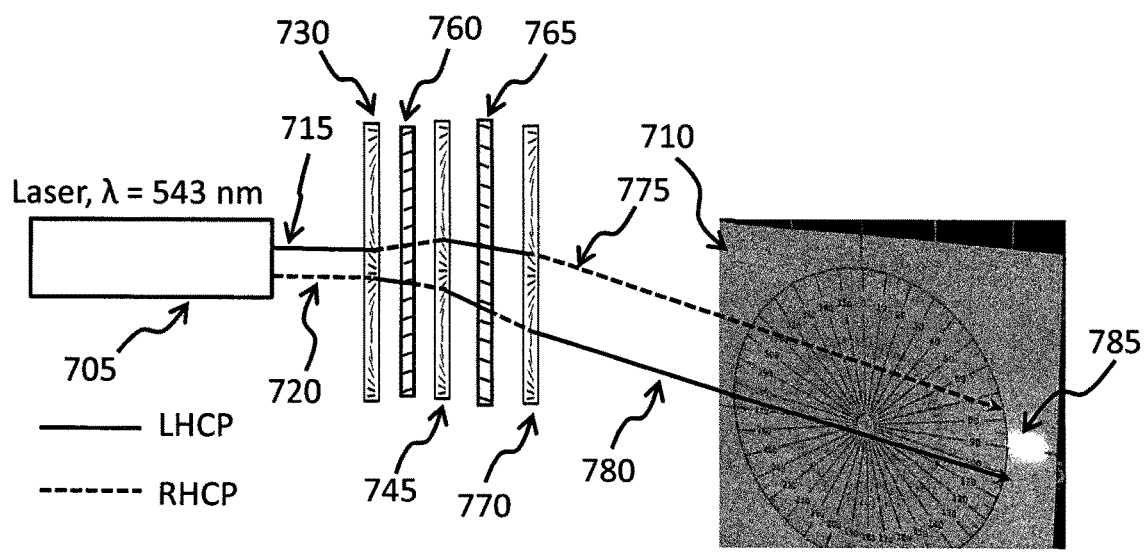
FIG. 7D shows a polarization-independent diffractive waveplate system, a configuration of three CDWs and two O-plates, such that laser light of any polarization is diffracted in the same direction. A beam propagates from a laser through the combination of CDWs and then impinges on a screen. A photograph of the screen shows that both circular polarization components of the laser beam impinge on the screen in the same location.

A preferred embodiment of the polarization-independent diffractive waveplate system 600 shown in FIG. 6 employs the polarization conversion method of FIG. 5, but the two beams propagating in different directions after the first phase retarder 530 in FIG. 5 are brought back to the same direction of propagation in the system disclosed in FIG. 6. A plane wave with an LHCP component 605 and an RHCP component 610 are incident on a first CDW 615, which deflects the LHCP component 605 of the incident beam upwards in FIG. 6, resulting in plane wave 620, while converting the polarization of this component to RHCP. The first CDW 615 deflects the RHCP component 610 of the incident beam downward in FIG. 6, resulting in plane wave 625, while converting the polarization of this component to LHCP. The two plane waves 620 and 625, with different circular polarizations and different directions of propagation, are incident on first phase retarder 630, which is designed to convert plane wave 625 from LHCP to RHCP, resulting in plane wave 640. The first phase retarder 630 is also designed to leave the polarization of plane wave 620 unchanged, resulting in RHCP plane wave 635 at the output of first phase retarder 630. Therefore, the two plane waves 635 and 640 both have right-hand circular polarization, so they are both deflected in the same direction by second CDW 645, and both are converted to LHCP by second CDW 645. There are therefore two plane waves propagating at the output from second CDW 645, both having left-hand circular polarization. The two additional elements, second phase retarder 660 and third CDW 665, are designed to bring together the directions of propagation of the two plane waves 650 and 655. This is accomplished by designing the second phase retarder 660 to convert the polarization of plane wave 655 from LHCP to RHCP, resulting in plane wave 675, while allowing the passage of plane wave 650 without affecting its polarization, resulting in plane wave 670. The period of third CDW 665 is the same as that of first CDW 615, which results in cancellation of the difference in propagation directions between plane waves 670 and 675. The results after third CDW 665 are two plane waves of opposite circular polarizations, RHCP beam 680 and LHCP beam 685, both propagating at an angle $\theta=\sin^{-1}(\lambda/\Lambda_2)$ in air relative to the normally-incident plane waves 605 and 610, where λ is the wavelength of the beam incident on polarization-independent diffractive waveplate system 600, and $\Lambda_2$ is the period of second CDW 645. The period $\Lambda_1$ of the first CDW 615 and the period $\Lambda_3$ of the third CDW 665 are equal, so the beam deflections by these two CDWs cancel out, leaving only the beam deflection by the second CDW 645.

As a specific example, it was assumed in calculating the diffraction angles in FIG. 6 that the wavelength is λ=633 nm, the period $\Lambda_1$ of the first CDW 615 and the period $\Lambda_3$ of the third CDW 665 are both 5 µm, and the period $\Lambda_2$ of the second CDW 645 is 2.61 µm. This results in a total deflection angle of $\theta=\sin^{-1}(\lambda/\Lambda_2)=\sin^{-1}(0.633/2.61)=14°$. These values are only for illustration. The polarization-independent diffractive waveplate system 600 shown in FIG. 6 would perform the desired polarization-independent beam deflection over a wide range of wavelengths and diffraction angles.

Since the functions of the first CDW 615 and the third CDW 665 in FIG. 6 are to separate the input beam into two beams propagating in different directions, then recombine them into one beam propagating in one direction, these components will be referred to as polarization discriminator diffractive waveplate optics.

Since the function of the first phase retarder 630 and the second phase retarder 660 in FIG. 6 is to change the circular polarization of one beam to the other polarization, and to have no effect on the circular polarization of the other beam, these components will be referred to as differential polarization converters.

Since the second CDW 645 performs the desired beam deflection function, and all the other components shown in FIG. 6 are used to manipulate light polarization, the CDW 645 will be referred to as a functional diffractive waveplate optic.

FIG. 7 shows a laboratory demonstration of the polarization-independent diffractive waveplate system 600 shown in FIG. 6. In this laboratory demonstration, a laser 705 with a wavelength of λ=543 nm with a linearly-polarized output beam was pointed at a screen 710. The linearly-polarized beam contained both an LHCP component 715 and an RHCP component 720. As shown in FIG. 7A, the laser beam was aligned so as to illuminate the center 725 of the screen. As shown in FIG. 7B, the introduction into the beam path of a first CDW 730 with a period of 17 µm resulted in the portions of the laser beam with different circular polarizations being deflected in opposite directions from the center of the screen, resulting in a spot 735 to the left of the center, and a spot 740 to the right of the center. As shown in FIG. 7C, the addition of a second CDW 745 with a period of 5 µm caused the two beam components to cross over each other and impinge on the screen at 750, further to the left of center than the spot 735, and at 755, further to the right of center than the spot 740. As shown in FIG. 7D, the addition of a first phase retarder 760, a second phase retarder 765, and a third CDW 770 with a period of 17 µm, caused the RHCP beam component 775 and the LHCP component 780 to coincide at location 785 on the screen. This was achieved because first phase retarder 760 converted the polarization of one of the beam components with one circular polarization, without changing the polarization of the other beam component with the other circular polarization. Because the period of third CDW 770 had the same period as first CDW 730, the effects on the propagation direction of these two CDWs cancelled each other, so the only remaining effect was the beam deflection by second CDW 745. Because the polarization of the two beam components was the same when the beam components were incident on CDW 745, it deflected them in the same direction.

The polarization-independent diffractive waveplate system shown in FIG. 6 and demonstrated in the laboratory experiment illustrated in FIG. 7 is a beam deflection system. Similar methods can be implemented in order to construct polarization-independent diffractive waveplate systems with functions other than beam deflection. In general, the technique can be used for any diffractive waveplate system with a plane wave input, or with a limited range of input angles of incidence. In another preferred embodiment, an additional polarization-independent diffractive waveplate system 800 shown in FIG. 8 is a lens based on diffractive waveplate components that has the same focal length for any light polarization. The spatial dependence of the anisotropy axis orientation of the diffractive waveplate lens 830, which is part of the polarization-independent diffractive waveplate system 800, is shown at 805, as was previously shown in illustrations of prior art in FIG. 2 and FIG. 3. However, the polarization-independent diffractive waveplate system shown in FIG. 8, unlike the diffractive waveplate lenses from prior art shown in FIG. 2 and FIG. 3, includes additional elements in order to achieve polarization-independent focal length. These additional elements are shown in the lower part of FIG. 8 for a small area 807 of the polarization-independent diffractive waveplate system. It is assumed that a plane wave with both an LHCP component 810 and an RHCP component 815 is incident on the polarization-independent diffractive waveplate system. The first optical element encountered by the incident light is the first diffractive waveplate axicon 820, which has the property that for a fixed wavelength, rays of light of one circular polarization are deflected by the same angle towards the axis of the lens at all radii within the clear aperture of the polarization-independent diffractive waveplate system, and rays of light of the other circular polarization are deflected by the same angle away from the axis of the lens at all radii with the clear aperture of the polarization-independent diffractive waveplate system. The next optical element encountered by the incident light is the first phase retarder 825, which is designed to switch the circular polarization of light that was deflected towards the axis of the system by the first diffractive waveplate axicon 820, and pass the light that was deflected away from the axis of the system by the diffractive waveplate axicon 820 without affecting its polarization. Because of this the manipulation of the polarization by the combination of the first diffractive waveplate axicon 820 and the first phase retarder 825, all of the light incident on the diffractive waveplate lens 830 has the same circular polarization, so light is deflected by this lens in the same direction, towards the axis of the polarization-independent diffractive waveplate system, regardless of the circular polarization it had at the input to the polarization-independent diffractive waveplate system. The angle through which light is deflected by the diffractive waveplate lens 830 is proportional to the distance from the center of the lens, as for any focusing lens. A second phase retarder 835 is designed to pass light that was LHCP at the input to the polarization-independent diffractive waveplate system without affecting its polarization, and to change the circular polarization of light that was RHCP at the input. This is possible because the direction of propagation of the light that was LHCP at the input to the polarization-independent diffractive waveplate system is different at the input to the second phase retarder 835 than the direction of propagation of the light that was RHCP at the input to the polarization-independent diffractive waveplate system at the input to this phase retarder. After this selective polarization conversion by the second phase retarder 835, the light is incident on a second diffractive waveplate axicon 840, which has the same period as the first diffractive waveplate axicon 820, and therefore exactly cancels the effect on the angles of propagation of the two components of the propagating radiation, bringing them to the same diffraction angle determined by the local period of the diffractive waveplate lens 830. Therefore, a ray of light of either circular polarization incident on the polarization-independent diffractive waveplate system 800 shown in FIG. 8 at any radius from the center of the lens is deflected towards the axis of the lens by an angle proportional to the radius. Since a ray of either circular polarization is diffracted by the same angle, and since any ray can be considered as some combination of left and right circularly polarized light, a ray of any polarization will be diffracted by the same angle, and the lens will therefore have the same focal length for any input polarization.

Since the functions of the first diffractive waveplate axicon 820 and the second diffractive waveplate axicon 840 in FIG. 8 are to separate the input beam into two beams propagating in different directions, then recombine them into one beam propagating in one direction, these components will be referred to as polarization discriminator diffractive waveplate optics.

Since the function of the first phase retarder 825 and the second phase retarder 835 in FIG. 8 is to change the circular polarization of one beam to the other polarization, and to have no effect on the circular polarization of the other beam, these components will be referred to as differential polarization converters.

The employment of diffractive waveplate axicons 820 and 840 as polarization discriminator diffractive waveplate optics is shown in FIG. 8 for purposes of illustration, not of limitation. The function of the polarization discriminator diffractive waveplate optics and the differential polarization converters shown in FIG. 8 could be performed by other combinations of diffractive waveplates and phase retarders than those used for purposes of illustration in FIG. 6 and FIG. 8. An alternative to the use of diffractive waveplate axicons in the polarization-independent diffractive waveplate system 800 shown in FIG. 8 is the use of CDWs as replacements for these components. If CDWs are used in the system of 800 instead of axicons as polarization discriminator diffractive waveplate optics, this would avoid the need for spatially-dependent phase retarders, as would be required for components 825 and 835 if diffractive waveplate axicons are used. As will be evident to those skilled in the art, there will be various advantages and disadvantages to be considered in the selection of the type of diffractive waveplate optic to be used as a polarization discriminator diffractive waveplate optic, and the type of phase retarder to be used as a differential polarization converter, in any given polarization-independent diffractive waveplate system. In all cases, the function of the combination of the polarization discriminator diffractive waveplate optic and the differential polarization converter is the same, which is to manipulate the polarization and direction of propagation of the input and output plane waves and rays in such a way that light of either circular polarization at the input to the polarization-independent diffractive waveplate system is deflected by the same angle by the functional diffractive waveplate optic that is also a part of the polarization-independent diffractive waveplate system.

Since the diffractive waveplate lens 830 performs the desired focusing function, and all the other components shown in FIG. 8 are used to manipulate light polarization, the diffractive waveplate lens 830 will be referred to as a functional diffractive waveplate optic.

The significant advantage of the polarization-independent diffractive waveplate system 800 shown in FIG. 8 over the polarization-independent focusing system of FIG. 4 is that although the system 800 shown in FIG. 8 requires five separate layers vs three components of the system of FIG. 4, all the layers 820, 825, 830, 835, and 840 of the polarization-independent diffractive waveplate system 800 are only a few wavelengths in thickness and do not require any distance between them, as opposed to the system of FIG. 4 which requires that the distance between its components be of the order of the focal length of the system. Therefore, the overall extent of the system 800 of FIG. 8 along the direction of propagation of the optical beam can be orders of magnitude smaller than that of the prior art system of FIG. 4.

The functional diffractive waveplate optics 745 in FIGS. 7 and 830 in FIG. 8 can, in another preferred embodiment, comprise polarizing optics. The polarizers, well-known in prior art, can be chosen to transmit the diffracted light of the design circular polarization handedness and absorb or reflect the light of the orthogonal polarization component. In systems comprising electrically controlled differential polarization converters, this would allow tuning the transmission of the unpolarized incident light diffracted (deflected or focused) by the system combining tunable transmission with a tunable filter action described in the prior art: Nelson V. Tabiryan, Sarik R. Nersisyan, Timothy J. White, Timothy J. Bunning, Diane M. Steeves, and Brian R. Kimball, Transparent thin film polarizing and optical control systems, AIP ADVANCES 1, 022153 (1-11), 2011; S. V. Serak, S. R. Nersisyan, N. V. Tabiryan, D. M. Steeves, B. R. Kimball, T. J. White & T. J. Bunning, High-contrast, low-voltage variable reflector for unpolarized light, Molecular Crystals and Liquid Crystals, Vol. 657 (1), 156-166, 2017, both incorporated by reference in their entirety.

There will be a limitation on the range of angles of incidence over which the desired polarization-independent beam deflection occurs when using a system such as 600 shown in FIG. 6 or 800 as shown in FIG. 8, because the effect on the polarization of plane waves transmitted through phase retarders 630 and 660 in FIG. 6, as well as 825 and 835 in FIG. 8, will depend on the angle of incidence on these components. For this and other reasons, it is desirable to have alternative designs and methods for fabricating polarization-independent diffractive beam deflectors, lenses, and other systems. In our previous U.S. patent application Ser. No. 16/293,122 and U.S. Provisional Application Ser. No. 62/638,651, we disclosed stacks of polarization volume gratings (PVGs) that have the property that they diffract light independent of the polarization of the light. Here we disclose improvement of the designs disclosed in these previous applications.

From the previous U.S. patent application Ser. No. 16/293,122 and Ser. No. 62/638,651, there are four distinct types of PVGs, distinguished by the chirality of the twist angles of the anisotropy axis within the PVGs, and the sign of the dependence of birefringence axis orientation on a Cartesian coordinate parallel to the surface of the PVG. We will describe these types of PVG here in order to facilitate an explanation of the improvements to be herein disclosed.

Polarization volume gratings (PVGs) are characterized by a two-dimensional periodic distribution of anisotropy axis orientation:

$$n(x,z) = [\cos \alpha(x,z), \sin \alpha(x,z), 0] \tag{I}$$

where $$\alpha(x, z) = H\frac{\pi}{\Lambda_x}x + V\frac{\pi}{\Lambda_z}z \tag{II}$$

In Eqn. (I), n(x, z) is a vector pointing along the local direction of the anisotropy axis in a Cartesian coordinate system (x, y, z) within a diffractive waveplate device. No dependence on the y-axis coordinate is shown in this equation because it is assumed that the direction of the anisotropy axis is independent of the y coordinate.

Figure 9:
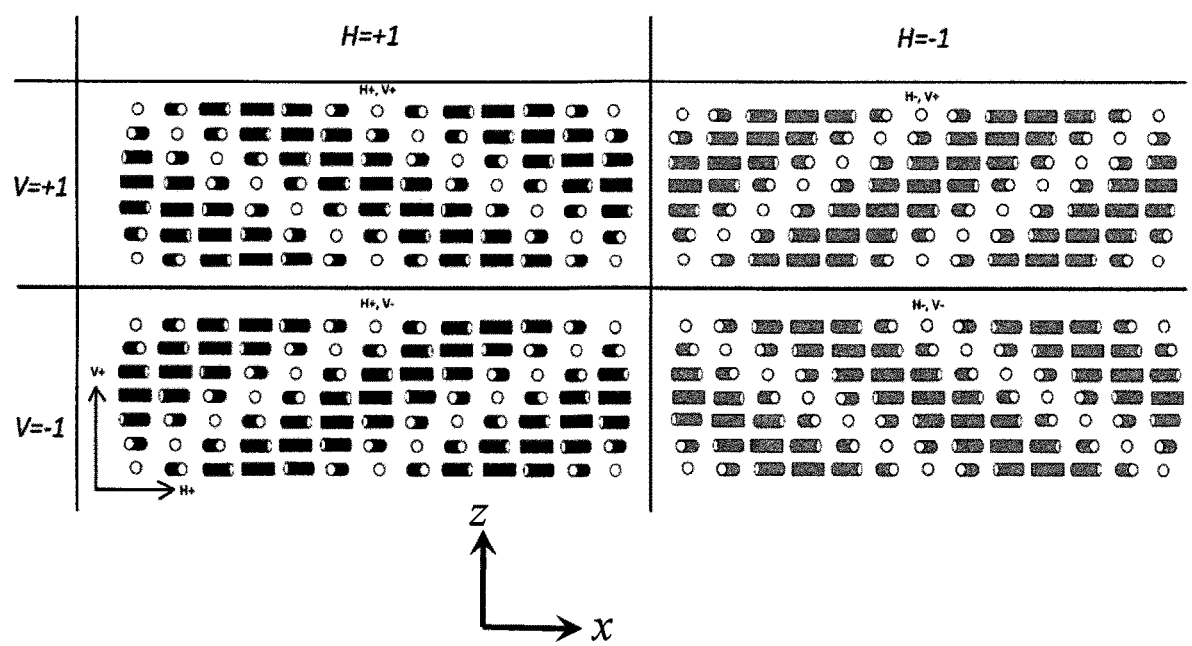
FIG. 9 shows the orientation of molecules as a function of two Cartesian coordinates in a diffractive waveplate structure with sinusoidal variation in anisotropy axis orientation along each of these two coordinates.

In Eqn. (II), $\Lambda_x$ and $\Lambda_z$ are periods along x- and z-axes while H=±1 and V=±1 define the anisotropy axis rotation directions along the two axes. There are four possible combinations of horizontal and vertical rotations of the anisotropy axis defined by the signs of H and V in Eqn. (II). FIG. 9 illustrates the four types of PVG. Each type is characterized by a value of either +1 or −1 for parameters H and V. The orientation of the molecules that result in optical birefringence are shown schematically in FIG. 9. The directions of the Cartesian coordinate axes that we will use in this disclosure to describe the PVGs are also shown in FIG. 9. As is evident in FIG. 9, the long axis of each of the molecules, representing the local anisotropy axis, is parallel to the x-y plane, which is perpendicular to the z axis. For all four types of PVG, the extent of the PVG in the x-y plane is assumed to be of the order of the optical aperture of the PVG, typically of the order of centimeters in the x coordinate, and the extent of the PVG in the z direction is assumed to be of the order of the operating wavelength of the PVG.

For simulations reported here, the diffraction efficiency is maximized by setting the thickness L of each PVG such that it satisfies the half-wave phase retardation condition LΔn=λ/2 at a particular wavelength of operation, where Δn is the birefringence of the material, and λ is the wavelength in vacuum. The simulations reported here assume that the material comprising the PVGs is a current state-of-the-art liquid crystal polymer (LCP) with Δn=approximately 0.13, and with extraordinary and ordinary refractive indices $n_e$=approximately 1.65, $n_o$=approximately 1.52, at the specific wavelength λ=approximately 550 nm. By definition, Δn=($n_e$−$n_o$). These parameters, together with the half-wave retardation condition, imply a grating thickness L=approximately 2.08 μm.

To minimize effects of Fresnel reflections in our modeling and simulation, we assume that each PVG and each stack of PVGs is immersed into a dielectric matching medium with spatially uniform, isotropic refractive index equal to the root mean square index $n_{rms}$ of the birefringent medium comprising the PVG:

$$n_{rms} = \sqrt{(n_e^2 + 2n_o^2)/3} \tag{III}$$

For the values of indices $n_e$ and $n_o$ given above, Eqn. (III) results in $n_{rms}$ being approximately equal to 1.56, a value that will be used throughout this disclosure as an example.

Figure 10:
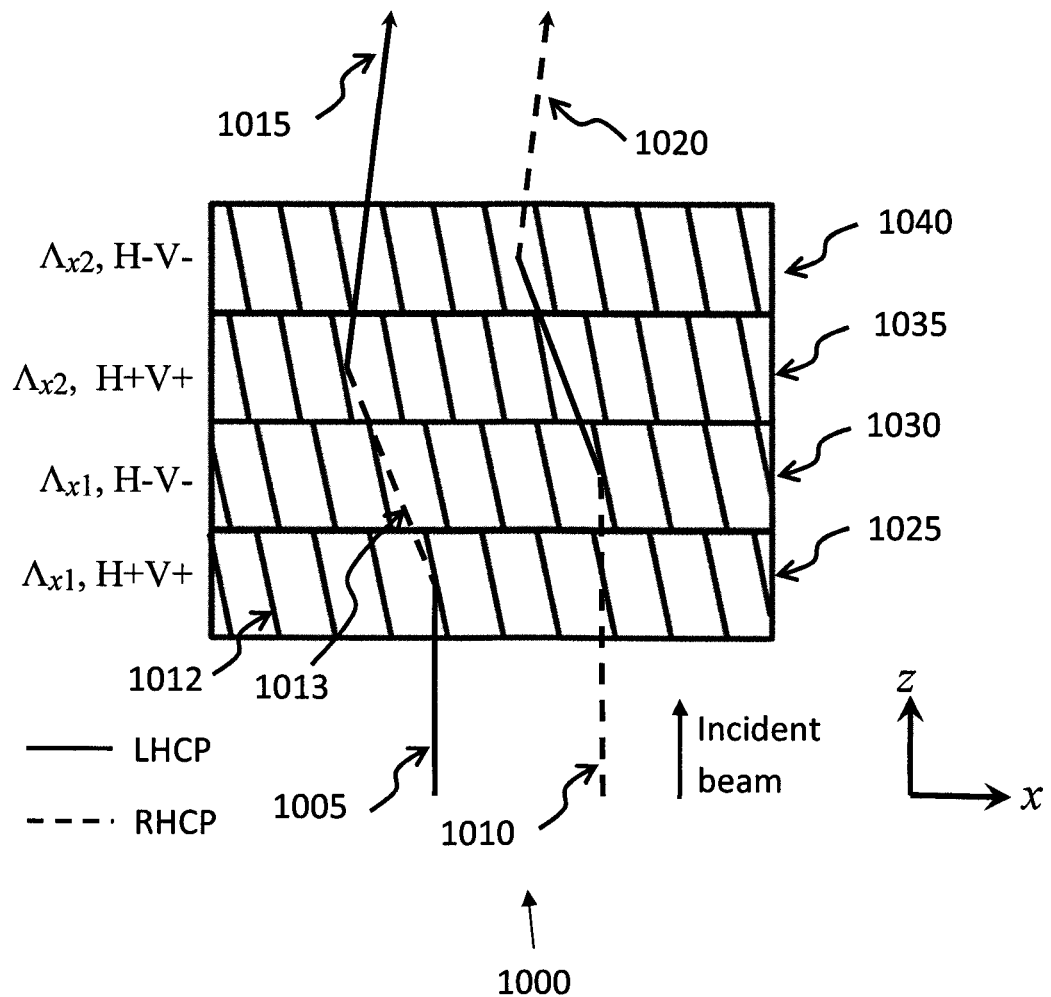
FIG. 10 shows the propagation of left-hand circularly-polarized (LHCP) light and right-hand circularly-polarized (RHCP) light into a stack of four polarization volume gratings (PVGs), with the input LHCP light being mostly diffracted by the first and third PVGs encountered by this light, and with the input RHCP light being mostly diffracted by the second and fourth PVGs encountered by this light.

As a consequence of the assumption that the PVGs are immersed in a matching medium, thereby reducing Fresnel reflections at the boundaries between the PVGs and air, the power of the reflected beams is found to be less than approximately 0.5% of the input power in all simulations described herein, therefore such reflected beams are neglected here. The light incident on the PVG is assumed to be a monochromatic plane wave of a combination of left- and right-hand circular polarization (LHCP and RHCP) with propagation vector in the x-z plane, as shown in FIG. 10. The electromagnetic field propagation through PVGs was modelled using Synopsys RSoft FullWAVE Finite Difference Time Domain (FDTD) software.

FIG. 10 illustrates one of the possible arrangements of a stack 1000 of four PVGs that diffracts a large fraction of light of any polarization in the same direction. For the example shown in FIG. 10, a plane wave light beam with both an LHCP component 1005 and an RHCP component 1010 is normally incident on the stack, with corresponding diffracted output beams 1015 and 1020. Planes of equal anisotropy axis orientation are shown as solid slanted lines 1012. In order to select the period $\Lambda_{x1}$ of the first PVG 1025 of the stack, the diffraction efficiency is computed for many different periods, while keeping the planes of equal anisotropy axis orientation such that diffraction occurs at the Bragg angle. Here $\Lambda_{x1}$ characterizes the variation in the x direction of the anisotropy axis, as described by Eqns. (I) and (II) with $\Lambda_x = \Lambda_{x1}$. The Bragg angle is the angle at which the direction of propagation of the input beam 1005 makes an angle with the planes of equal anisotropy axis orientation 1012 that is equal to the angle that the diffracted beam 1013 makes with these planes of equal anisotropy axis orientation 1012. For each value of $\Lambda_{x1}$, the first-order diffraction angle $\theta_1$ in the matching medium for normal incidence is $$\theta_1 = \sin^{-1}\left(\frac{\lambda}{n_{rms}\Lambda_{x1}}\right) \tag{IV}$$

The value of the period $\Lambda_z$ in the z direction that results in diffraction at the Bragg angle is $$\Lambda_z = \frac{\Lambda_{x1}}{\tan\frac{\theta_1}{2}} \tag{V}$$

For each value of $\Lambda_{x1}$, a value of $\Lambda_z$ is computed from Eqns. (IV) and (V), thereby defining the orientation of the anisotropy axis in the first PVG 1025 using Eqn. (II). Values of H=+1 and V=+1 (noted in the short form H+V+ in FIG. 10) were used in describing the first PVG 1025 in order to obtain near 100% diffraction efficiency for LHCP light. It is found that for a period $\Lambda_{x1}$=0.960 μm, and with $\Lambda_z$ computed from Eqns. (IV) and (V) and inserted in Eqn. (II), the diffraction efficiency for LHCP light computed using FDTD modeling is >99.8% and the diffraction efficiency for RHCP light is <0.5%. This observation is reflected in FIG. 10 by showing the LHCP input light 1005 being diffracted by PVG 1025 into a different direction 1013, while RHCP input light 1010 continues to propagate beyond PVG 1025 in the same direction as the input light.

In the ordering of the stack of PVGs assumed for FIG. 10, the second PVG 1030 of the stack of PVGs is modeled exactly the same as the first layer, with the same periods in the x and z directions, except that the values of H=−1 and V=−1 are used in Eqn. (II) to define the orientation of the anisotropy axis for all positions within PVG 1030, instead of the values H=+1 and V=+1 used for PVG 1025. Calculations using FDTD software show that PVG 1030 strongly diffracts RHCP light and has little effect on LHCP light. This is reflected in FIG. 10 by showing the beam that was RHCP at the input being diffracted by PVG 1030.

After the first two PVGs 1025 and 1030 shown in FIG. 10, both the LHCP and RHCP light at wavelength λ=550 nm have been diffracted in the same direction through an angle of 21.5° in the matching medium, or 35.0° in air after Fresnel refraction at the interface between the matching medium and air. In some applications, polarization-independent diffraction through this angle is in itself a useful phenomenon. Other applications, in which another angle of diffraction is desired, can be addressed by additional PVGs 1035 and 1040. As a specific example, a period of $\Lambda_{x2}$=0.873 μm was selected for PVGs 1035 and 1040.

As noted above, two of the PVGs in the stack of PVGs shown in FIG. 10 have a period of $\Lambda_{x1}$=0.960 μm, and the other two have a period of $\Lambda_{x2}$=0.873 μm. Since 0.960 μm=(9.6 μm)/10 and 0.873 μm=(9.6 μm)/11, the period of the stack of PVGs shown in FIG. 10 is $\Lambda_{net}$=10·$\Lambda_{x1}$=11·$\Lambda_{x2}$=9.60 μm. The relationship between the periods $\Lambda_{x1}$ and $\Lambda_{x2}$ of the individual PVGs, and the overall period $\Lambda_{net}$ of the stack, is given by $$\Lambda_{net} = \frac{\Lambda_{x1}\Lambda_{x2}}{\Lambda_{x1} - \Lambda_{x2}} \tag{VI}$$

Equations (IV) and (V) provide the angle of diffraction and the period in the z direction to ensure that diffraction occurs at the Bragg angle for a beam normally incident on the PVG. As is evident in FIG. 10, the optical beam is not normally incident on PVGs 1035 and 1040. For these PVGs, the following method is used to compute the period $\Lambda_z$ characterizing the variation in anisotropy axis orientation along z axis. The angles in the matching medium of diffraction angle $\theta_{net}$ of the output beams 1015 and 1020 are as follows:

$$\theta_{net} = \sin^{-1}\left(\frac{m\lambda \cdot (\Lambda_{x1} - \Lambda_{x2})}{n_{rms}\Lambda_{x1}\Lambda_{x2}}\right) = \sin^{-1}\left(\frac{m\lambda}{n_{rms}\Lambda_{net}}\right) \tag{VII}$$

In Eqn. VII, m is the order of diffraction. The angle of the Bragg planes in PVGs 1035 and 1040 can then be computed as $$\theta_2 = \frac{\theta_1 - \theta_{net}}{2} \tag{VIII}$$

The period of variation of the anisotropy axis orientation along the z direction for PVGs 1035 and 1040 is given by $$\Lambda_z = \frac{\Lambda_2}{\tan\theta_2}$$

Diffraction by a PVG with a period of 0.960 μm, following by diffraction with a period of 0.873 μm, results in an overall first-order diffraction angle of 2.1° in the matching medium, as is demonstrated with Eq. (VII) using the previously-mentioned values of λ=550 nm, $\Lambda_{x1}$=0.960 μm, $\Lambda_{x2}$=0.873 μm, $n_{rms}$=1.56, and m=1. This results in a diffraction angle of 3.3° in air.

Each of the four PVGs 1025, 1030, 1035, and 1040 shown in FIG. 10 act primarily only on one circular polarization of light. The PVGs can be put in any order, and will still diffract both polarizations of light by 3.3° in air in the positive x direction, using the Cartesian coordinate system defined in FIG. 10.

In the current invention, we determined that the order in which the PVGs are placed has a significant impact on the overall diffraction efficiency. Specifically, if the PVGs are placed in the order shown in FIG. 11, a higher diffraction efficiency will be obtained than if the ordering is as in FIG. 10. For this reason, the stack of four PVGs 1100 in FIG. 11 is appropriately referred to as a polarization-independent high-efficiency diffractive waveplate system.

Figure 11:
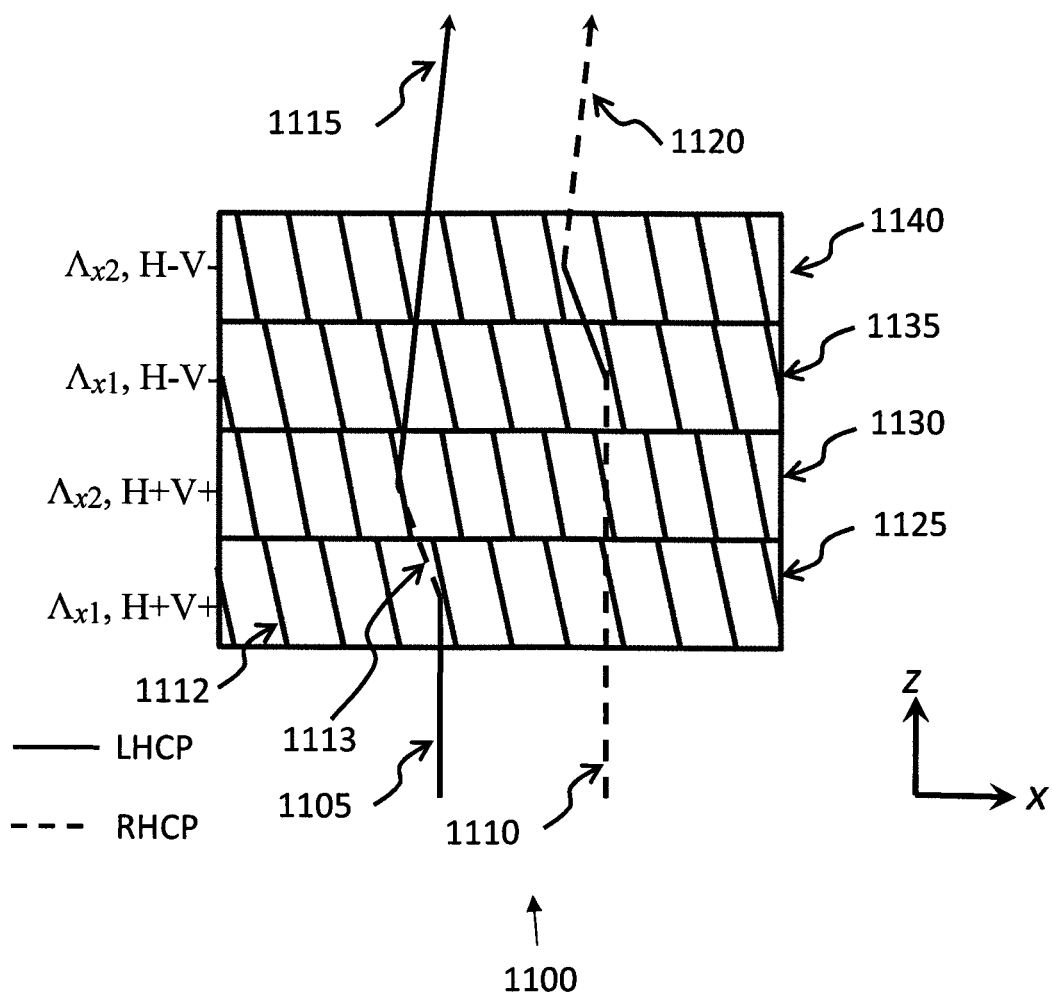
FIG. 11 shows the propagation of LHCP light and RHCP light into a polarization-independent high-efficiency diffractive waveplate system, consisting of a stack of four polarization volume gratings (PVGs), with the input LHCP light being mostly diffracted by the first and second PVGs encountered by this light, and with the input RHCP light being mostly diffracted by the third and fourth PVGs encountered by this light.

For the example shown in FIG. 11, a plane wave light beam with both an LHCP component 1105 and an RHCP component 1110 is incident on the stack 1100. The input LHCP plane wave component 1105 is diffracted by the stack 1100 into the output plane wave component 1115. The input RHCP plane wave component 1110 is diffracted by the stack 1100 into the output plane wave component 1120. The first PVG shown in FIG. 11, shown at 1125, has the same structure as the first PVG in FIG. 10, shown at 1025.

Specifically, both PVG 1025 and 1125 have a period in the x direction of $\Lambda_{x1}$=0.96 μm, and both have values of H=+1 and V=+1 in the specification of the anisotropy axis orientation of Eqn. (II). However, the order of the other three PVGs 1130, 1135, and 1140 in FIG. 11 is different from the order of the other three PVGs in FIG. 10.

As was the case in FIG. 10, slanted solid lines 1112 indicate planes of equal anisotropy axis orientation in FIGS. 11, and 1113 indicates the direction of propagation of LHCP light diffracted into the first order of the first PVG 1125.

Figure 12:
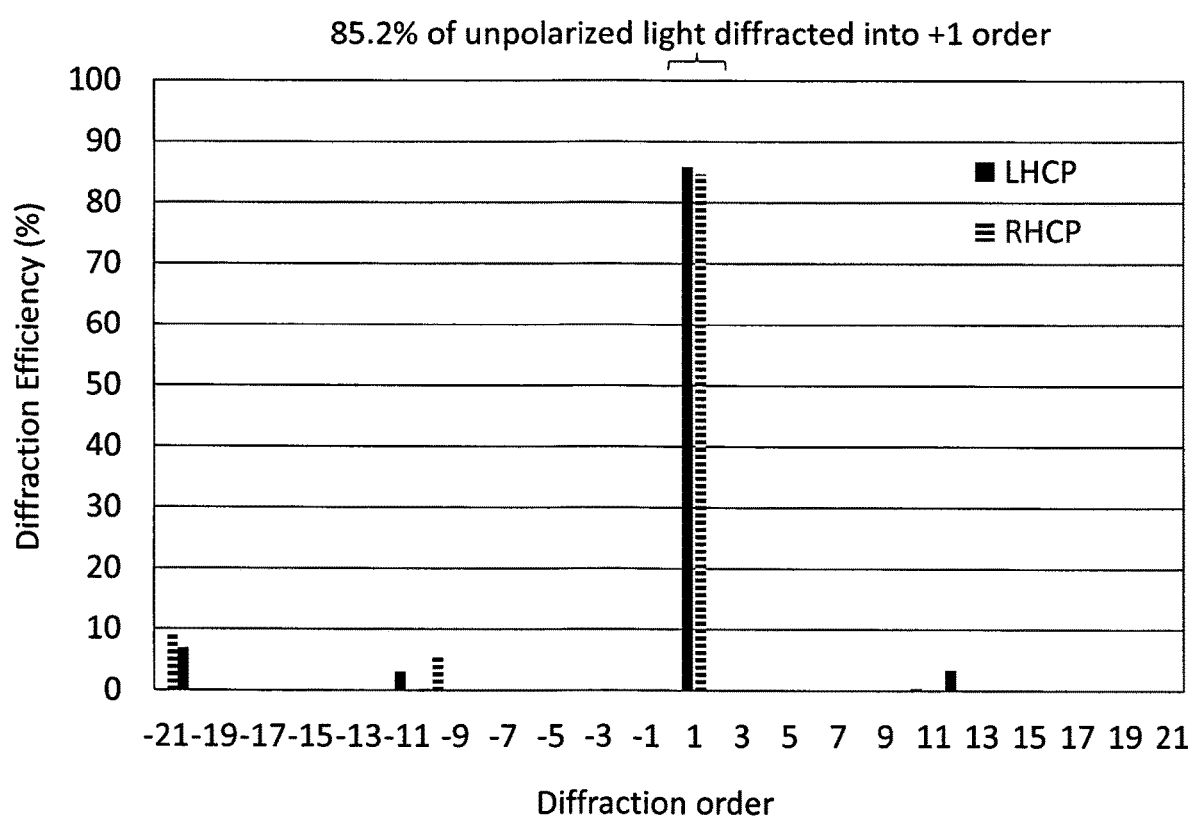
FIG. 12 shows the calculated diffraction efficiency for both LHCP and RHCP light of the stack of four PVGs shown in FIG. 10, for a specific set of characteristics of the elements of the stack, and for the specific order of PVGs in the stack as shown in FIG. 10.
Figure 13:
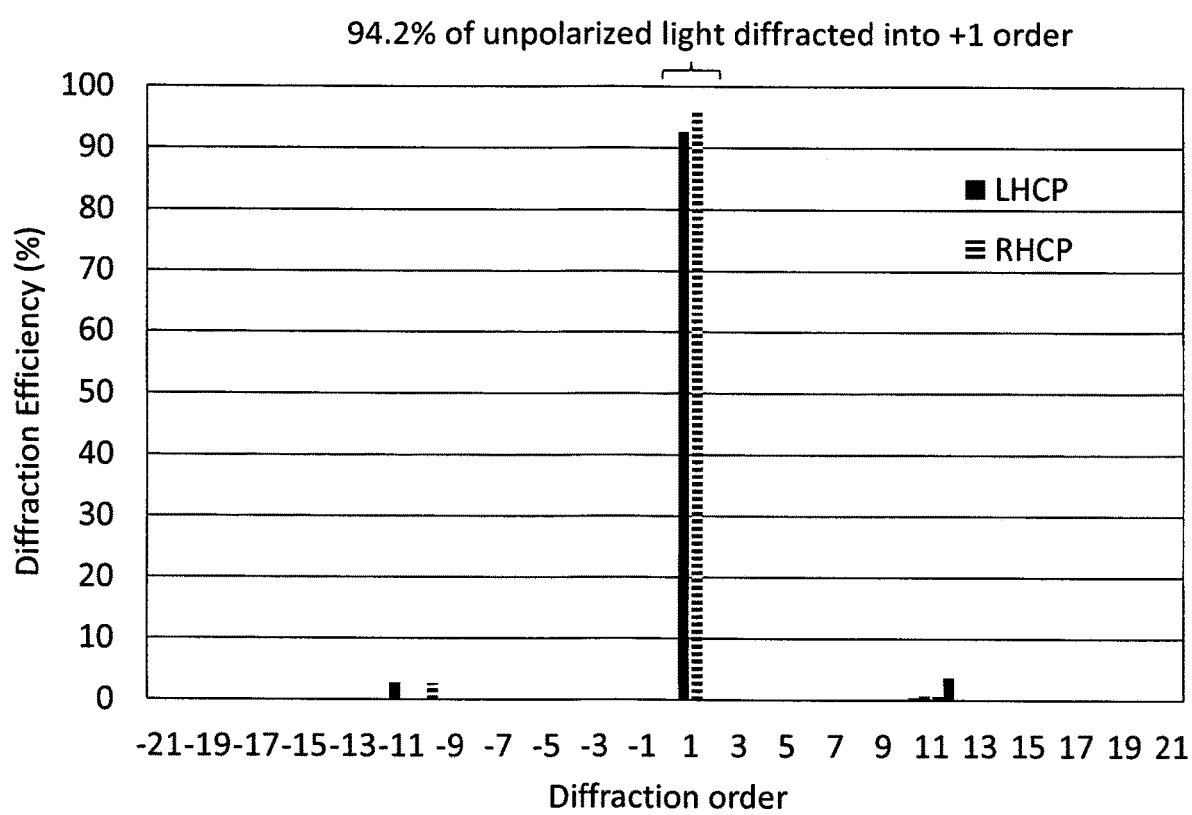
FIG. 13 shows the calculated diffraction efficiency for both LHCP and RHCP light of a polarization-independent high-efficiency diffractive waveplate system consisting of the stack of four PVGs shown in FIG. 11, for the specific order of PVGs in the stack as shown in FIG. 11.
Figure 14:
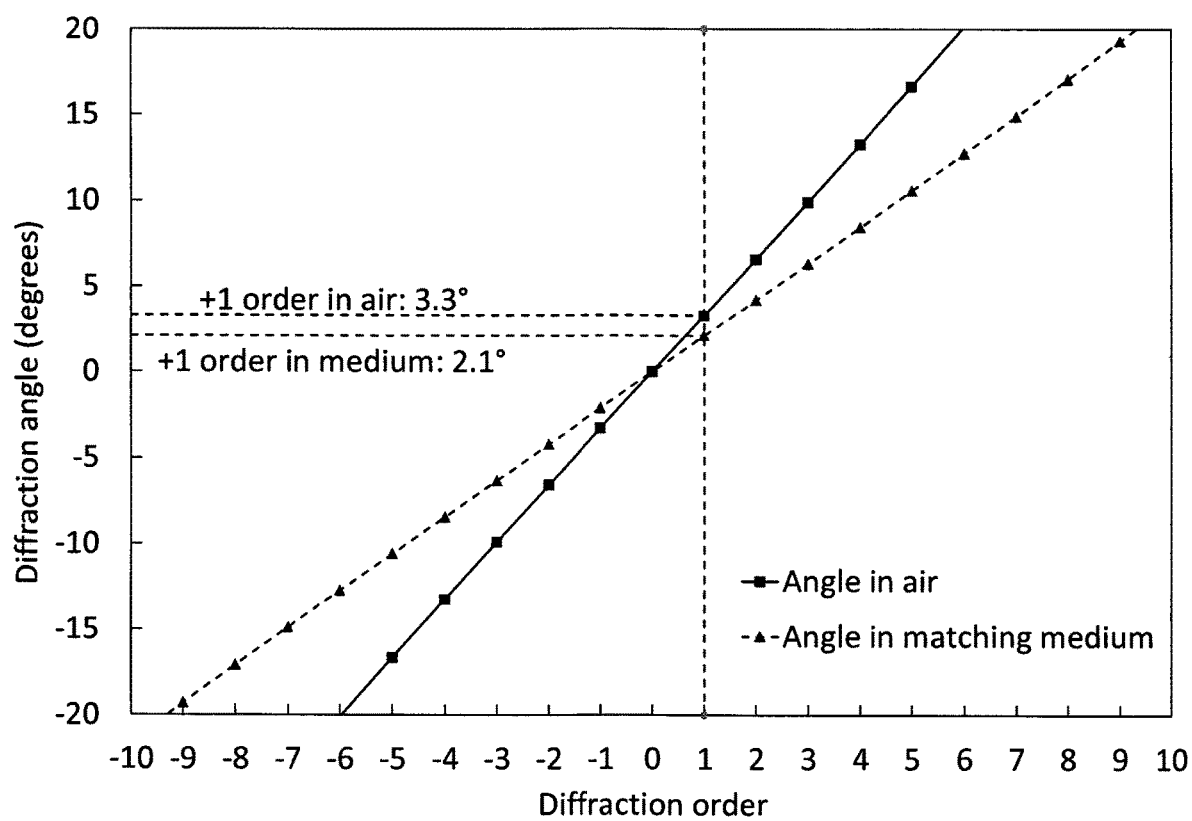
FIG. 14 shows the diffraction angle at 550 nm wavelength for each of several diffraction orders for a stack of PVGs with a period of 9.6 μm, both within a refractive matching medium and in air.

The importance of the difference in the order in which the light beam encounters the PVGs in FIG. 10 and FIG. 11 is illustrated in FIG. 12 and FIG. 13. The results of FDTD calculations of diffraction efficiency for the PVG ordering of FIG. 10 are shown in FIG. 12. The results of FDTD calculations of diffraction efficiency for the PVG ordering of FIG. 11 are shown in FIG. 13. According to these figures, a greater percentage of incident light is diffracted into the +1 order by the stack of PVGs shown in FIG. 11 than is diffracted by the stack of PVGs shown in FIG. 10. The diffraction angle in the matching medium, and the corresponding diffraction angle in air, are shown in FIG. 14 for some of the lower diffraction orders.

As shown in FIG. 12, with the PVG ordering and PVG structures shown in FIG. 10, 85.2% of unpolarized light would be diffracted through the design angle of 3.3° in air (i.e. diffraction order m=+1) as an example. As shown in FIG. 13, with the PVG ordering and PVG structures shown in FIG. 11, 94.2% of unpolarized light would be diffracted through the same angle of 3.3° in air. The FDTD calculations are performed for LHCP and RHCP light under the assumption that the percentage of unpolarized light diffracted into any given direction is the average of the percentages diffracted of LHCP and RHCP light.

Since each PVG in the stack of four PVGs comprising the polarization-independent high-efficiency diffractive waveplate system 1100 shown in FIG. 11 diffracts light of one circular polarization, while allowing light of the other circular polarization to pass without changing its direction of propagation or its polarization, each PVG in this stack of four PVGs can be appropriately referred to as a polarization discriminator diffractive waveplate optic.

While the discussion herein of polarization-independent diffraction from a stack of four PVGs is for the case in which the light in normally incident on the stack of PVGs, similar performance could readily be obtained for other angles of incidence. In general, for any angle of incidence, the diffraction efficiency for one circular polarization, for example LHCP, will approach 100% for any period $\Lambda_x$, provided $\Lambda_z$ is adjusted so that diffraction occurs at the Bragg angle. A particular value of $\Lambda_x$ can then be identified, with corresponding value of $\Lambda_z$ in accordance with Eqn. (IX) to assure diffraction at the Bragg angle, such that not only does the diffraction efficiency for LHCP approach 100%, but the diffraction efficiency for RHCP approaches zero. The periods $\Lambda_x$ and $\Lambda_z$ for the remaining three PVGs can then be identified as explained above for the case of normal incidence. As is the case for normal incidence, the thickness L of each PVG for the case of non-normal incidence must meet the condition L$\Delta$n=$\lambda$/2 at a particular wavelength of operation.

Diffractive waveplate devices can be configured to provide the ability to switch the optical effects of the devices on and off. This capability to switch could be implemented in the polarization-independent diffractive waveplate system 600 shown in FIG. 6 by making the second CDW 645 switchable by prior art means. If the second CDW 645 in FIG. 6 is fabricated in the form of a liquid crystal layer between photoaligned surfaces over transparent conductive electrodes, the diffractive effect can be switched on and off by withdrawing or applying an alternating-current (AC) electric field across the liquid crystal layer comprising the CDW. Similarly, if the individual PVGs 1125, 1130, 1135, and 1140 comprising the polarization-independent high-efficiency diffractive optical system 1100 shown in FIG. 11 are each a liquid crystal layer with a chiral dopant between photoaligned surfaces over transparent conductive electrodes, the diffractive effect can be switched on and off by withdrawing or applying an AC electric field across the liquid crystal layer comprising each PVG.

Figure 15:
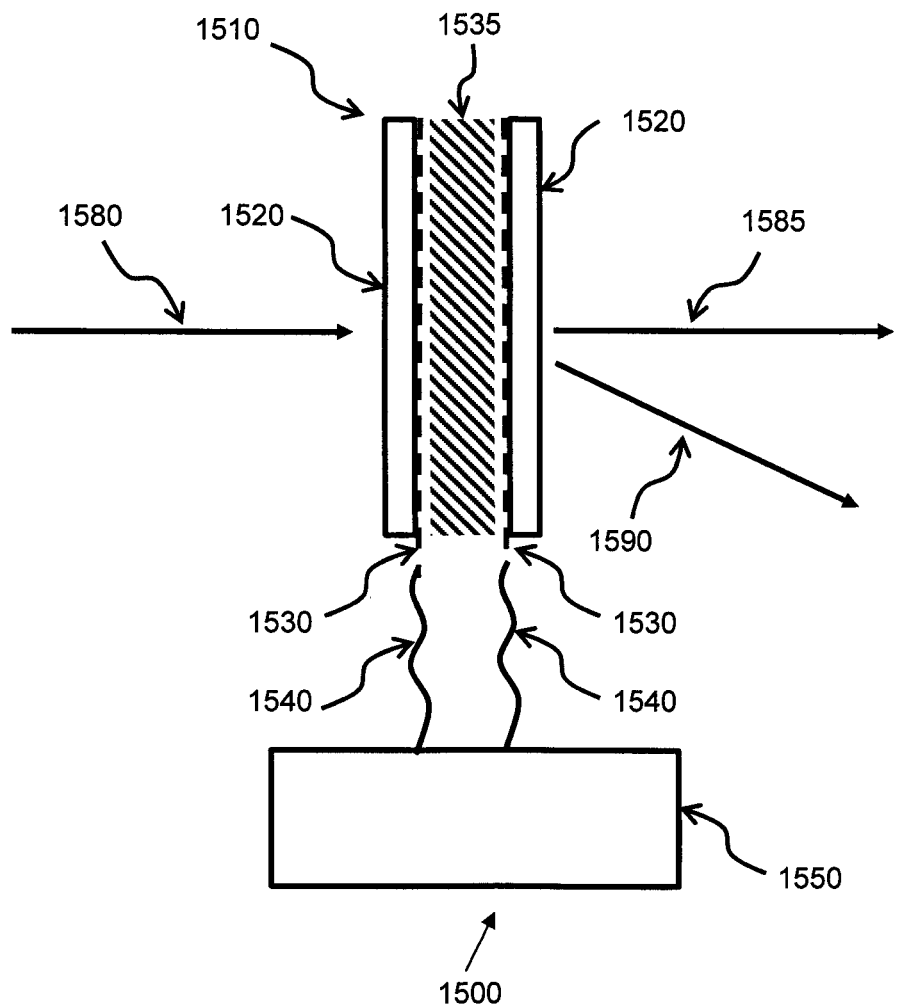
FIG. 15 shows a schematic illustration of the elements of a switchable diffractive waveplate.

A switchable diffractive waveplate system 1500 is illustrated schematically in FIG. 15. The switchable diffractive waveplate system consists of a switchable diffractive waveplate 1510 and an electronic controller 1550. The switchable diffractive waveplate 1510 consists of transparent optical substrates 1520, transparent conductive coatings with an overcoated patterned alignment layer 1530, and a layer of liquid crystal 1535. Electrical conductors 1540 connect the transparent conductive coatings 1530 with the electronic controller 1550. The electronic controller applies an alternating current electric potential across the liquid crystal layer 1535 through the electrical conductors 1540, such that the linear retardance of the layer of liquid crystal 1535 is one-half wave for the operating wavelength for one value of the AC electric potential, and is near zero or any positive integer number of waves at another AC electric potential.

When it is desired to switch the switchable diffractive waveplate 1510 to the non-diffracting state, the electronic controller 1550 applies an alternating current electric potential of approximately 10 volts peak (20 volts peak to peak) across the layer of liquid crystal 1535. The incident light 1580 is almost all diffracted into the diffracted directions 1590 when the switchable diffractive waveplate 1510 is in the diffracting state, and into the non-diffracted direction 1585 when it is in the non-diffracting state.

In order for the polarization-independent diffractive waveplate system shown in FIG. 6 to include the ability to switch the beam deflection on or off, the second CDW 645 would be made switchable, as disclosed in FIG. 15.

In order for the polarization-independent diffractive waveplate system shown in FIG. 8 to include the ability to switch the focusing function on or off, the diffractive waveplate lens 830 would be made switchable, as disclosed in FIG. 15.

In order for the polarization-independent high-efficiency diffractive waveplate system shown in FIG. 11 to include the ability to switch the beam deflection function on or off, each of the PVGs 1125, 1130, 1135, and 1140 would be made switchable, as disclosed in FIG. 15.

Although specific advantages have been enumerated above, various embodiments may include some, none, or all of the enumerated advantages.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A polarization-independent diffractive waveplate system comprising:
    an input unpolarized light beam;
    a first polarization discriminator diffractive waveplate optic;
    a first differential polarization converter;
    at least one functional diffractive waveplate optic;
    a second differential polarization converter;
    a second polarization discriminator diffractive waveplate optic;
    wherein the first polarization discriminator diffractive waveplate optic separates the input unpolarized light beam into two circularly polarized beams of orthogonal handedness propagating in different directions;
    the first differential polarization converter converts polarization of only one of the two circularly polarized beams emanating from the first polarization discriminator diffractive waveplate optic such that both beams acquire identical circular polarization without changing propagation directions;
    the at least one functional diffractive waveplate optic diffracts both of beams received from the first polarization converter into different predetermined propagation directions;
    the second differential polarization converter converts polarization of one of the beams received from the at least one functional diffractive waveplate optics such that two beams acquire orthogonal handedness of circular polarizations without changing propagation directions imposed at an output from the at least one functional diffractive waveplate optic; and wherein
    the second polarization discriminator diffractive waveplate optic combines two beams received from the second differential polarization converter into a collinear propagating beam having a propagation direction determined by a diffraction angle imposed by the at least one functional diffractive waveplate optic.

2. The polarization-independent diffractive waveplate system of claim 1 wherein the first differential polarization converter comprises a birefringent material with anisotropy axis tilted to make different angles with respect to propagation directions of beams at an input to the first differential polarization converter, a magnitude of birefringence of the birefringent material and a tilt angle chosen such that two beams at an output from the first differential polarization converter acquire identical circular polarization by virtue of the first differential polarization converter reversing circular polarization handedness of one of the beams received from the polarization discriminator diffractive waveplate optic while maintaining circular polarization handedness of the second beam.

3. The polarization-independent diffractive waveplate system of claim 2 wherein the second differential polarization converter comprises a refractive birefringent material with anisotropy axis tilted to make different angles with respect to propagation directions of beams at an input of the second differential polarization converter, a magnitude of birefringence of the birefringent material and a tilt angle chosen such that circular polarization handedness of one of the beams received from the functional diffractive waveplate optics is reversed relative to the orthogonal circular polarization upon transmission through the second differential polarization converter while maintaining circular polarization handedness of the second beam received from the functional diffractive waveplate optic.

4. The polarization-independent diffractive waveplate system of claim 1 wherein at least one of the first and the second polarization discriminator diffractive waveplate optics comprises a diffractive waveplate axicon.

5. The polarization-independent diffractive waveplate system of claim 1 wherein at least one of the first and the second polarization discriminator diffractive waveplate optics comprises a cycloidal diffractive waveplate.

6. The polarization-independent diffractive waveplate system of claim 1, wherein at least one of the functional diffractive waveplate optic comprises at least one of a diffractive waveplate lens and a cycloidal diffractive waveplate.

7. The polarization-independent diffractive waveplate system of claim 1, wherein orientation of an anisotropy axis of one of the first and the second polarization discriminator diffractive waveplate optics and of at least one of the functional diffractive waveplate optics varies along one of Cartesian coordinates in a plane parallel to a surface of the first and the second polarization discriminator diffractive optics.

8. The polarization-independent diffractive waveplate system of claim 1 wherein at least one of the polarization discriminator diffractive waveplate optic, the differential polarization converter, the functional diffractive waveplate optics, are switchable at an influence of at least one of the following stimuli: electric field, optical radiation, and temperature.

9. The polarization-independent diffractive waveplate system of claim 1 wherein at least one of the functional diffractive waveplate optics are spectrally tunable at an influence of at least one of the following stimuli: electric field, optical radiation, and temperature.

10. The polarization-independent high-efficiency diffractive waveplate system as in claim 1, wherein at least one of the first and the second polarization discriminator diffractive waveplate optics performs with high diffraction efficiency in a spectrally broad band of wavelengths.

11. The polarization-independent high-efficiency diffractive waveplate system as in claim 10, wherein at least one of the first and the second differential polarization converters performs polarization conversion functions in a spectrally broad band of wavelengths.

12. The polarization-independent high-efficiency diffractive waveplate system as in claim 1, wherein at least one of the first and the second polarization discriminator diffractive waveplate optics, the first and the second differential polarization converters, and the at least one functional diffractive waveplate optic, is a polymer film.

13. A polarization-independent diffractive waveplate system as in claim 1 wherein the at least one functional diffractive waveplate optic further comprises polarizing optics.

\* \* \* \* \*